(12) United States Patent
Hayton et al.

(10) Patent No.: US 10,680,812 B2
(45) Date of Patent: Jun. 9, 2020

(54) EVENT ATTESTATION FOR AN ELECTRONIC DEVICE

(71) Applicant: Trustonic Limited, Cambridge (GB)

(72) Inventors: Richard Hayton, Cambridge (GB); Chris Loreskar, Haverdal (SE); Donald Kenneth Felton, Ely (GB)

(73) Assignee: Trustonic Limited, Cambridge (GB)

( * ) Notice: Subject to any disclaimer, the term of this patent is extended or adjusted under 35 U.S.C. 154(b) by 192 days.

(21) Appl. No.: 15/819,294

(22) Filed: Nov. 21, 2017

(65) Prior Publication Data
US 2018/0198604 A1    Jul. 12, 2018

(30) Foreign Application Priority Data

Jan. 10, 2017  (GB) .................................. 1700367.4
Jun. 20, 2017  (GB) .................................. 1709800.5

(51) Int. Cl.
| | |
|---|---|
| *H04L 29/06* | (2006.01) |
| *H04L 9/08* | (2006.01) |
| *G06F 21/73* | (2013.01) |
| *G06F 21/57* | (2013.01) |
| *G06F 21/44* | (2013.01) |
| *G06F 15/02* | (2006.01) |
| *H04L 9/32* | (2006.01) |
| *H04W 12/08* | (2009.01) |

(Continued)

(52) U.S. Cl.
CPC .......... *H04L 9/088* (2013.01); *G06F 15/0208* (2013.01); *G06F 21/44* (2013.01); *G06F 21/57* (2013.01); *G06F 21/73* (2013.01); *H04L 9/3242* (2013.01); *H04W 12/08* (2013.01); *G06F 2221/0704* (2013.01); *H04W 12/10* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 7,363,495 B2 * | 4/2008 | Felt .................... | G06Q 20/3829 713/170 |
| 8,225,110 B2 | 7/2012 | Ståhl et al. | |

(Continued)

OTHER PUBLICATIONS

Partial European Search Report dated Jun. 6, 2018 in EP Application No. 17200828.6, 11 pages.

(Continued)

*Primary Examiner* — Maung T Lwin
(74) *Attorney, Agent, or Firm* — Nixon & Vanderhye P.C.

(57) ABSTRACT

A method for validating an electronic device 2 includes receiving attestation information provided by the electronic device 2 attesting that the electronic device 2 has received a plurality of event attestations. Each event attestation provides a cryptographically authenticated attestation to the occurrence of a respective event during a lifecycle of the electronic device. A validation result is determined that indicates whether the attestation information is valid. Providing separate cryptographically authenticated attestations for respective events in the lifecycle of the device can simplify manufacturing of the devices in a multistage manufacture process compared to an approach using a single device-specific attestation attesting that the entire process is trusted.

16 Claims, 9 Drawing Sheets

(51) Int. Cl.
*H04W 12/10* (2009.01)
*H04W 88/02* (2009.01)

(56) References Cited

U.S. PATENT DOCUMENTS

| | | | | |
|---|---|---|---|---|
| 8,468,330 | B1* | 6/2013 | Reed | G06F 21/51 |
| | | | | 713/164 |
| 9,680,872 | B1* | 6/2017 | Roth | H04L 9/3213 |
| 9,784,260 | B2* | 10/2017 | Lee | G06F 21/72 |
| 9,853,811 | B1* | 12/2017 | Levy | H04L 9/088 |
| 2004/0003273 | A1* | 1/2004 | Grawrock | G06F 21/57 |
| | | | | 713/193 |
| 2006/0005009 | A1 | 1/2006 | Ball et al. | |
| 2010/0169667 | A1* | 7/2010 | Dewan | G06F 21/10 |
| | | | | 713/193 |
| 2011/0087887 | A1 | 4/2011 | Luft et al. | |
| 2012/0069119 | A1 | 3/2012 | Teggatz et al. | |
| 2014/0253222 | A1 | 9/2014 | Merchant et al. | |
| 2015/0263855 | A1* | 9/2015 | Schulz | H04L 9/0827 |
| | | | | 713/155 |
| 2015/0264021 | A1* | 9/2015 | Schulz | H04L 63/0414 |
| | | | | 713/170 |
| 2015/0294119 | A1* | 10/2015 | Gundam | G06F 9/441 |
| | | | | 713/2 |
| 2016/0006735 | A1* | 1/2016 | La Fever | G06F 21/44 |
| | | | | 713/171 |
| 2018/0181756 | A1* | 6/2018 | Campagna | H04L 9/088 |

OTHER PUBLICATIONS

Trusted Computing Group, TCG "Trusted Platform Module Library" Part 1: Architecture, Family "2.0" Level 00, Revision 01.38, Sep. 29, 2016, 284 pages.
UK Combined Search and Examination Report for GB 1709800.5, 7 pages.

* cited by examiner

EVENT ATTESTATION FOR AN ELECTRONIC DEVICE

This application claims priority to GB Patent Application No. 1700367.4 filed 10 Jan. 2017, and GB Patent Application No. 1709800.5 filed 20 Jun. 2017, the entire contents of each of which are hereby incorporated by reference.

BACKGROUND

Technical Field

The present technique relates to the field of electronic devices. More particularly, it relates to providing a cryptographic attestation for an electronic device.

Technical Background

Increasingly, electronic devices are being used to access services which may involve handling of potentially sensitive information, such as mobile banking, access to health care services or handling of the employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it can be important for a service provider to be able to verify that the electronic device meets certain requirements in order to trust that interaction with the electronic device is secure. The service provider may need to have confidence that certain events have occurred during the manufacturing process used to manufacture the electronic device or in subsequent adaptations of the device during its lifecycle. For example, such events could include a system-on-chip being embedded into a component by a device manufacturer, a device passing through a certain quality assurance step, or some specific software being provisioned on the device. Cryptographic techniques can be used to provide the required root of trust. For example a cryptographic key may be embedded in the device during manufacture and the device can later use that key to prove to an external verifier that the device meets the required properties.

SUMMARY

At least some examples provide a method for validating an electronic device, comprising:
receiving attestation information provided by the electronic device attesting that the electronic device has received a plurality of event attestations, each event attestation providing a cryptographically authenticated attestation to the occurrence of a respective event during a lifecycle of the electronic device; and
determining a validation result indicating whether the attestation information is valid.

At least some examples provide a validation apparatus for validating an electronic device, comprising:
communication circuitry to receive attestation information provided by the electronic device attesting that the electronic device has received a plurality of event attestations, each event attestation providing a cryptographically authenticated attestation to the occurrence of a respective event during a lifecycle of the electronic device; and
processing circuitry to determine a validation result indicative of whether the attestation information is valid.

At least some examples provide an electronic device, comprising:
communication circuitry to communicate with an external device; and
processing circuitry to control the communication circuitry to transmit a validation request to a validation apparatus, the validation request comprising attestation information attesting that the electronic device has received a plurality of event attestations, each event attestation comprising a cryptographically authenticated attestation to the occurrence of a respective event during a lifecycle of the electronic device.

At least some examples provide a method for an electronic device, comprising:
generating a validation request comprising attestation information attesting that the electronic device has received a plurality of event attestations, each event attestation comprising a cryptographically authenticated attestation to the occurrence of a respective event during a lifecycle of the electronic device; and
transmitting the validation request to a validation apparatus.

At least some examples provide a method for manufacturing or adapting a batch of electronic devices, comprising:
causing a predetermined event to be performed for each of the batch of electronic devices; and
storing an event attestation in each of the batch of electronic devices, the event attestation comprising a cryptographically authenticated attestation to the occurrence of the predetermined event;
wherein the event attestation is cryptographically authenticated using the same cryptographic key for each of the batch of electronic devices.

At least some examples provide an electronic device manufacturing equipment, comprising:
equipment to cause a predetermined event to be performed for each of the batch of electronic devices; and
equipment to store an event attestation in each of the batch of electronic devices, the event attestation comprising a cryptographically authenticated attestation to the occurrence of the predetermined event;
wherein the event attestation is cryptographically authenticated using the same cryptographic key for each of the batch of electronic devices.

At least some examples provide a computer program comprising instructions for controlling a data processing apparatus to perform any of the methods described above.

Further aspects, features and advantages of the present technique will be apparent from the following description of examples, which is to be read in conjunction with the accompanying drawings.

DESCRIPTION OF EXAMPLES

Figure 1:
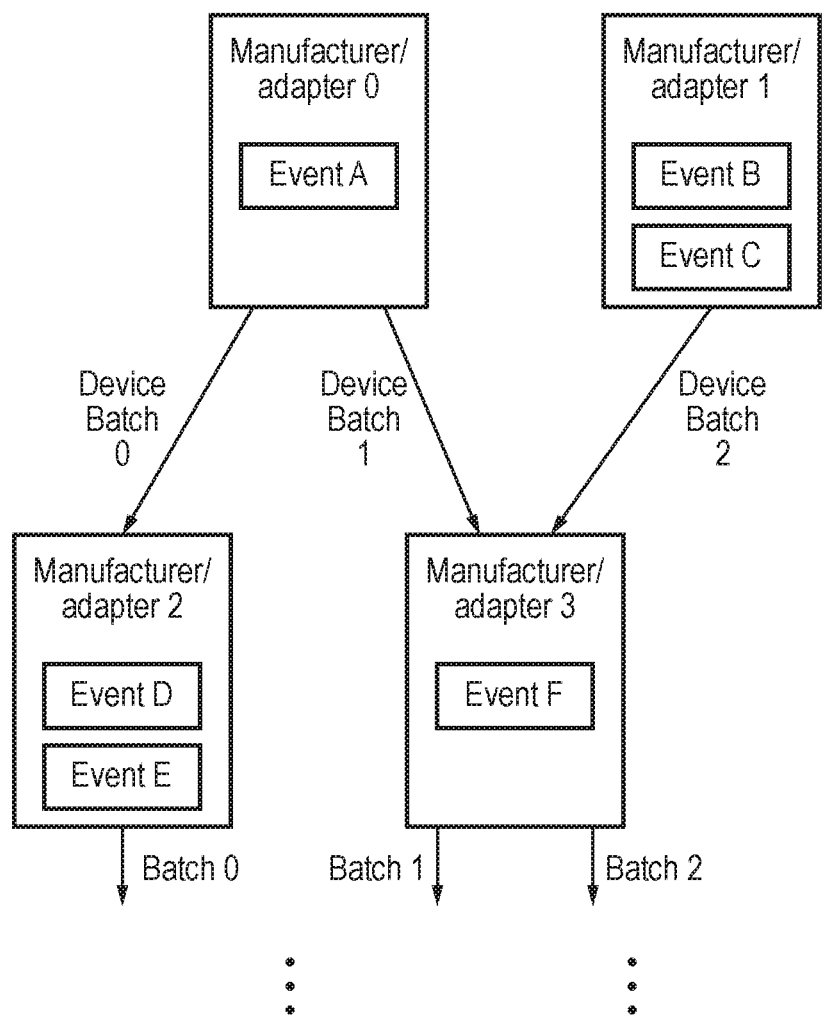
FIG. 1 schematically illustrates an example of a multi-stage process for manufacturing electronic devices.

A provider of a service may require that, in order for a given action to be permitted for an electronic device, the device is able to demonstrate that it has undergone certain events during its life cycle which enable the device to be trusted. For example the events could include the installation of a hardware component, the installation of some software, or the device passing a quality assurance programme, etc. The particular events required for a given action may vary from service provider to service provider. One approach for providing a root of trust may be to provide each device which has undergone the required events with a secret device-specific key which can be verified by cryptographic means to determine whether a given electronic device is one of the trusted devices known to have undergone the required processing steps.

However, this approach may suffer from some problems. In practice, electronic device manufacture may be a multi-stage process and different stages of the manufacturing process may be carried out by different parties. If a single device-specific key, which attests that the entire manufacturing process of the device is safe, is to be injected into a given device, this may require one manufacturer in the chain to inject the key and attest that other stages performed by other parties have also been performed. In practice, that manufacturer may be processing many batches of devices which may be intended for different purposes and may be passed to different parties after it has left the hands of the current manufacturer, or may have passed through multiple different hands on route to the current manufacturer. Hence, to be able to attest that the device has undergone a given manufacturing process, the manufacturer injecting the key may need to distinguish different batches of devices intended for different routes through the manufacturing chain. Also, using device-specific credentials may require a greater amount of on-line communication with the device during the manufacturing process as well as recordal of the device-specific information associated with the known devices with a validation service provider, which may require greater network communication and more complex measures for protecting the security of the device-specific credentials. All of these factors may increase the cost of manufacturing of such electronic devices, which may not be worthwhile if some of the devices are relatively low resource devices where the cost of the device itself may be relatively low but still some security capability may be required. This is particularly the case for Internet of Things-type devices which may be relatively power- and area-constrained, and so making the manufacturing process more efficient can be beneficial.

In the examples discussed below, a number of event attestations attesting to the occurrence of specific events during the lifecycle of the electronic device can be provided to the electronic device. For example, if events are performed by different manufacturing parties, each party may inject a separate event attestation into the device providing a cryptographically authenticated attestation to the fact that the event performed by that particular party has taken place. When validating an electronic device, the device can send attestation information to a validator to attest that it has received the two or more event attestations, and the validator can determine a validation result indicative of whether the attestation information is valid.

Hence, by providing an attestation that a number of separate event-specific attestations have each been received, this can greatly simplify the manufacturing process, as there is no need for the current manufacturer injecting an attestation to attest to any event outside the control of that manufacturer, and when a given event is performed on a certain batch of devices, each of those devices may have the corresponding event attestation injected regardless of the subsequent fate of those devices which may then diverge through the manufacturing chain. For example there is no need to consider whether a given sensor will eventually be used within a refrigerator or a heating system.

The event attestations are cryptographically authenticated. A cryptographically authenticated message may include a message protected using encryption, digital signatures, message authentication codes or one way functions.

In some examples, the attestation information provided by the electronic device to the validation apparatus may be the event attestations themselves. In this case, validation of an event attestation may comprise checking that the format of the attestation is valid, and/or that the attestation is signed by a key associated with a known manufacturer/adapter permitted to cause the corresponding required event to be performed for the device.

Alternatively, the event attestations may not actually be transmitted to the validation apparatus, and instead the electronic device may send a cryptographically authenticated attestation attesting that the electronic device has verified that the plurality of event attestations were previously received by the electronic device. Hence, it is not essential for the actual event attestations to be sent to the validation apparatus, as long as the electronic device can prove that it did receive them. For example, a signed message specifying identifiers of the event attestations could be sent in place of the actual event attestations. In this example, it is not essential for the electronic device to continue to store the event attestations after they have been validated—an event attestation could be discarded once the electronic device has stored information indicating that the event attestation has previously been seen and validated.

In some embodiments, the event attestations may be device-specific, so that the cryptographically authenticated event attestations provided to a number of electronic devices to attest to the same event may be different (e.g. a device identifier could be included in the attestation to track attestation usage).

However, in other examples the same event attestation may be used to attest to the occurrence of a given event for two or more different electronic devices. Hence, the event attestation may be device-independent, so it may not include any information specific to the particular electronic device such as a device identifier. This can further simplify the manufacturing process because it means that a batch of devices which undergo a particular event can all be injected with exactly the same event attestation, which can reduce the complexity of managing the manufacturing equipment, as it is not necessary to track which devices are provided with specific attestations.

In one example, the method may comprise determining a usage count indicative of a number of other electronic devices that have already attested to receiving a particular event attestation, and determining the validation result in dependence on the usage count. For example an event attestation could be limited to being used on a certain number of devices (e.g. the number of devices in the batch that were originally injected with that event attestation), and the validation apparatus (or a service provider apparatus) could compare the usage count with a set threshold to determine whether the device should be accepted. This enables detection of fraud attempts when an event attestation for one device is intercepted and reused for another device. Although identifying that more than the threshold number of uses of the attestation have been attempted may not be enough to identify which particular devices are the fraudulent devices, nevertheless this can enable the service provider to determine that the corresponding event attestation can no longer be trusted and take steps to counteract this.

Event attestations can be revoked when fraud attempts or other issues with the event attestation are identified (e.g. fraudulent devices using leaked event attestations as discussed above, or a certain manufacturer being found to have manufactured devices in a way which means that manufacturer can no longer be trusted). A record of at least one revoked event attestation can be maintained and the validation result may depend on whether a particular event attestation attested in the attestation information is one of the revoked event attestations in the revocation record.

In some examples, each of the event attestations held by the device may be entirely independent of each other.

However, in some examples an event attestation attesting to the occurrence of a later event during the lifecycle of the device may include event chain information which depends on information from at least one event attestation for attesting to the occurrence of at least one earlier event that should have occurred before the later event during the lifecycle of the electronic device. There may be a cryptographic linkage between successive event attestations installed on the device. For example, each device may include a cryptographic hash of certain contents of the event attestation, and the hash generated for one event attestation may include the hash of the previously installed event attestation. When validating the electronic device, the validation result may depend on whether the event chain information for the received event attestations from the device indicates that events occurred in a prohibited sequence. For example, this could be useful for detecting whether the device passed via a rogue manufacturer in between valid manufacturers and the rogue manufacturer inserted an additional event attestation into the device. The validator could detect that there was an additional attestation injected which is not expected, and so could prevent the predetermined action in case the rogue party has performed some action to compromise the device security. Also, even among valid manufacturers who are trusted by the validator, there could be certain paths between manufacturers which are not permitted. For example a certain event may need to have taken place before another event can be performed securely and so if the second event actually took place before the first event then this may compromise the security of the device. Hence, by chaining the attestations together this can allow devices processed in a prohibited sequence to be detected and hence enables better decisions on whether a device can be trusted.

The method may also comprise receiving from the electronic device an audit log which indicates a time of occurrence of one or more local events occurring at the electronic device. The validator may determine the validation result in dependence on the audit log. For example the one or more local events could comprise at least one of: installation of a given event attestation on the electronic device; calling of a given program code function by the electronic device; booting of the electronic device; and updating of one or more attributes of the electronic device. Logging the time of occurrence of such events can help to detect suspicious patterns of processing of a device, such as when a device undergoes an unusually long delay between two steps of the manufacturing process, or if the device has been booted or had its attributes updated at some time which does not match the known time at which the corresponding batch of devices was held by a trusted manufacturer. The validator may maintain batch processing information indicating when a batch of electronic devices associated with a given event attestation were processed by a given manufacturer and may determine the validation result in dependence on a comparison of the audit log with the batch processing information. Hence, while the event attestation itself provides a cryptographic attestation to the occurrence of certain events, there are other events that may be generated and stored by the device itself (such as being booted). These events will not be cryptographically signed or attested, but can form part of the event sequence recorded in the audit log that can be later used to attest to device integrity.

As well as timings, the audit log could also log other tracking information, such as the identifiers of peripheral devices connected to the device (either external peripherals or locally connected peripherals connected to a bus within the device), which could enable suspicious behaviour to be identified. In general, the use of the audit log relating to events occurring at the device can further increase trust in the electronic device, as it can enable suspicious behaviour to be detected even if it does not result in additional event attestations being injected or some event attestations being omitted or incorrectly formed by an untrusted manufacturer/adapter.

There are a number of ways in which the validator (or the electronic device if the event attestations are validated locally) can determine whether a given event attestation is a cryptographically authenticated attestation for a required event. In general, a given event attestation may be validated using a cryptographic key which is associated with a manufacturer or adapter permitted to cause the corresponding event to be performed for the device. In one example, each event attestation could be accompanied by a signature of certain contents of the attestation, which is generated using a key associated with the manufacturer or adapter (the key could be a symmetric key or a private key of a cryptographic key pair). The validator or the electronic device can then verify that the signature is authentic by checking the signature using the symmetric key or the public key corresponding to the private key. In another example, the event attestation could be encrypted using the manufacturer key (symmetric or private key) and then decrypted at validation in order to check that the attestation is valid. When the device has undergone multiple manufacturing steps and so multiple attestations are required to verify that the predetermined action can be performed, then each of those required attestations may be validated using the corresponding keys associated with the permitted manufacturers or adapters allowed to perform the event. In some cases, a given event may be allowed to be performed by more than one manufacturer and so the validation process may include attempting to validate a given event attestation with the keys associated with each of the pool of manufacturers or adapters associated with that event, until it is determined either that none of the manufacturers or adapters have cryptographically authenticated the provided event attestation or that one of the manufacturers or adapters has authenticated the event attestation as valid.

The same cryptographic key may be used to validate event attestations for two or more electronic devices. For example, all devices made by a particular manufacturer may be authenticated using the same manufacturer key. By avoiding the need for device-specific cryptographic keys, this greatly reduces the overhead for the manufacturer, as providing means for generating cryptographic keys bespoke for each device, and securely storing the keys and registering the device-specific keys with a validator, can be expensive. Also, using the same key for authenticating each of a manufactured batch of devices means there is no requirement for cryptographic processing during the actual production of the devices, since the cryptographic authentication associated with a given event attestation provided to a batch of devices could be pre-prepared offline and the manufacturing equipment could simply inject the pre-prepared material into each device. Using device-independent keys also means that manufacturers can inject the attestations using a single-stage push of information to each device, rather than a query or more complex device interaction, so that the attestation injection process can be faster and more amenable to integration in a factory workflow.

In some examples, the validation result may comprise a determination of whether a predetermined action is permitted for the electronic device. The action allowed to be performed when the attestation information is validated may vary, and may be specific to the particular application for which the device is used. For example, the action may comprise enabling the electronic device to access a predetermined service. Access to the service could for example include the device being allowed to upload data to the service provider or to receive data in return. In some cases the verification of the event attestations may not be the only check performed in determining whether the action is allowed. For example, as well as verification of whether the hardware device itself meets the requirements for security, there could also be validation of the user of the device such as based on credentials such as user passwords, biometric material, etc. Hence, while the predetermined action may be prevented if a required event attestation is not provided by the electronic device or cannot be cryptographically authenticated as valid, even if all the required cryptographically authenticated event attestations are available from the electronic device, this is not necessarily enough to allow the predetermined action to be performed, as there could be additional checks as well.

Alternatively, the validation result may comprise a device report indicative of information derived from the event attestations, which could then be used by another apparatus or software program to determine whether an action is permitted at the device.

The checking of the attestation information as discussed above could in some cases be performed directly by a service provider of the service for which the electronic device is seeking access.

However, often the service providers themselves may not have the cryptographic support for verifying the event attestations as authentic. Also, it may not be practical for a given service provider to track all the allowed manufacturers or adapters who are permitted to perform actions for the device. Hence, the validation of the event attestations may be performed by a third party server, which may verify event attestations on behalf of a range of different service providers. In this situation, it can be particularly useful to provide a device report to a service provider of the predetermined service, the device report containing information derived from information extracted from the event attestations. In some cases the device report could simply comprise an indication of whether the attestation information was valid, and/or a list of the events that were identified as having been performed on the electronic device. However, the device report could also include other information. For example the event attestations may have certain information on which manufacturers performed the events, or details of the particular events that were performed. The event attestations may be encoded in binary form which may not be immediately intelligible to a service provider. Hence, in some cases the third party server validating the event attestations could include in the device report some information obtained by expanding or parsing contents of the event attestations, in order to provide more useful information to the service provider. The report could also include information about use of event attestations (e.g. how many previous devices have already used the same event attestation).

A validation apparatus may be provided for performing the method for determining whether a predetermined action is permitted for a device as discussed above. The validation apparatus may have communication circuitry which receives the attestation information from the device, and processing circuitry to validate the attestation information, and determine a validation result in dependence on whether the attestation information is valid and, when valid, on a set of events identified by the attestation information as occurring during the lifecycle of the electronic device.

In a corresponding way, the electronic device may have communication circuitry to communicate with external devices (such as a server), and processing circuitry to control the communication circuitry to transmit a validation request to a validation apparatus, the validation request comprising attestation information attesting that the electronic device has received a plurality of event attestations, each event attestation comprising a cryptographically authenticated attestation to the occurrence of a respective event during a lifecycle of the electronic device. Again, by attesting to the fact that the electronic device has received a number of separate event attestations for multiple events in the lifecycle of the device, the manufacturing process for making the device can be simplified.

Again, the attestation information could be the event attestations themselves, or a cryptographically authenticated attestation attesting that the electronic device has verified that the event attestations were received. The event attestations could have different formats and may comprise a range of different kinds of information. At the simplest level the attestation could simply comprise an identifier indicating that a particular event occurred and cryptographic means of authenticating that attestation as valid, such as a signature or encryption applied using the manufacturer key.

In one example, each event attestation may be associated with a hash value corresponding to a result of a predetermined hash function applied to contents of the event attestation. For example the hash function may be a cryptographic hash function or one way function, so that it is computationally infeasible for the contents of the event attestation to be determined if only the hash function is known. This enables a local check of the event attestation to be performed by the electronic device itself when a new event attestation is provided to the device. The processing circuitry of the electronic device may prevent storage of the new event attestation when a mismatch is detected between the hash value of the new event attestation and a result of the predetermined hash function applied to the contents of the new event attestation. By checking that the event attestation is correctly formed when the attestation is first installed on the device, this can reduce the risk that the device is rendered inoperational due to processing errors, e.g. random bit flips caused by particle strikes or other errors during the installation process. In some examples, the device may have a secure region of the storage which is protected (by hardware infrastructure or by software techniques such as encryption) from access by less secure processes. At least a part of the event attestation (e.g. the hash value, or another part of the message used to derive the hash) may be stored in the secure storage. Other parts of the event attestations could be stored in normal storage or in the secure storage. By storing at least part of the message or the hash in secure storage, this ensures that even if the non-secure part is modified, the secure part cannot be modified and so the modification can be detected.

In one example, a new event attestation provided to the device may originally include a stub portion, and the hash value for the new event attestation may depend on the stub portion. However, the stub portion may be discarded by the processing circuitry of the electronic device after the new event attestation has been validated by the device. Hence, the stub portion may not be stored in the storage circuitry of the device (or may initially be stored but then invalidated or overwritten). The new event attestation may be associated with a signature which is derived from the hash value and the contents of the new event attestation excluding the stub portion. The attestation information may comprise the signatures associated with the event attestations or an indication that the signatures associated with the event attestations have been validated. Each signature may be generated using a cryptographic key associated with a manufacturer or adapter who caused the corresponding event to be performed on the electronic device during the lifecycle of the electronic device. The stub portion can be a random value or pseudo-random value, for example.

By including a stub portion in the original attestation provided to the device, which is used to generate the hash but not the signature, this makes it very difficult for an attacker who has retrieved an attestation from a device to inject the same attestation into another device in order to clone a trusted device and fraudulently purport that a different device is trusted. It is computationally infeasible for the attacker who has retrieved the event attestation to recreate the stub from the hash value or succeed at recreating the stub by brute force attempts of different values, and without the stub another device will not accept the attestation, as the hash of the attestation would not match the result of hashing the contents of the received event attestation.

In some cases, while a certain event may have taken place for a given electronic device, it may not be certain that that device can definitely be trusted, in case some action has been performed on the device which could lead to the original event being cancelled or reversed in some way. For example, for an attestation that certain software has been installed, that attestation may only be valid if the software continues to be installed on the device and it can be trusted that that software had not been modified in some way. Hence, some types of event attestations may be conditional, so that the manufacturer or adapter providing the event attestation may attest to the occurrence of a predetermined event on condition that a predetermined condition is satisfied by the electronic device. In this case, the processing circuitry of the electronic device may, at the time of making the validation request to the validating apparatus, validate whether the predetermined condition is still satisfied, and if the predetermined condition is not satisfied, may prevent transmission of the attestation information attesting that the conditional event attestation was validly received.

For example the predetermined condition could be that specific software is installed at a predetermined region of the storage circuitry. The conditional event attestation could specify a region of memory and an expected hash code indicating the expected value of applying some hash function to the contents of the specified region. By checking whether the result of hashing the contents of the specific memory region matches the expected hash code, the device can determine whether the software previously installed is still unmodified, and hence whether it is safe to provide the conditional event attestation.

Alternatively, a hash of the contents of the memory region could be transmitted to the validation apparatus, and the validation apparatus could validate the software's integrity by checking whether the hash result matches the expected hash code.

The electronic device may have hardware architecture support for providing certain security mechanisms on the device which enable the device to be trusted (in some examples, the installation of a system on chip having such hardware architecture features may be one of the events for which an event attestation is required). For example, the processing circuitry of the device may support a secure execution environment and a less secure execution environment in order to protect certain code and data associated with secure functions from access by less secure code operating in the less secure execution environment. An example of such a hardware architecture technique may be the TrustZone® architecture provided by ARM® Limited of Cambridge, UK. Hence, some steps performed on the electronic device, such as the validation of whether the predetermined condition is satisfied for a conditional event attestation, or the validation of whether a new attestation to be installed on the device is correctly formed, may be performed under control of software executing in the secure execution environment, to increase security.

In examples where the validation request comprises a request to access a predetermined service using the electronic device, the device may receive a signal from the validator or from the service provider to indicate that access has been enabled. In response to the access to the service being enabled, the processing circuitry may trigger at least one of: deletion of the plurality of event attestations from storage circuitry; deletion of at least one device key for protecting communication between the electronic device and the validation apparatus; deletion of a device identifier for identifying the electronic device to the validation apparatus; storage of at least one device key for protecting communication between the electronic device and a service provider of the predetermined service; and storage of a device identifier for identifying the electronic device to the service provider of the predetermined service. Hence, the event attestations need not be permanently installed on the device, and once a device has been enabled for access to a service then the event attestations may no longer serve any purpose and it may be more secure to delete these event attestations to free up storage capacity (especially for resource-constrained Internet-of-Things type devices, the amount of storage capacity provided may be extremely limited). Similarly, any device keys of device identifiers associated with communication with the validation apparatus can be deleted. New device keys or identifiers may be established associated with communication with the service provider of the predetermined service. Not all of these measures are essential, and which steps are performed upon registering for a service may be selected specific to the particular service. For example, in some cases event attestations, device identifier or device keys could be retained in order to enable additional lifecycle events to be logged for the device after registering for the service.

It may be desirable for a device, once already enabled for access to a given service, to later be reused for a different service or by a different user, and so to forget some or all aspects of the devices past lifecycle (for example who the previous owners were). The device could then re-registered with a service (which could be the same service as before or a different service). To support this, a given service provider may be able to issue a rebirth request to an electronic device which may trigger the device to delete information arising from use of the predetermined service since the access was enabled. The processing of the rebirth request may again require certain cryptographic authentication to be performed, such as authentication that the rebirth request did come from the service provider with which the device was previously registered. The device could for example delete any application-specific data or keys.

If the device is "reborn" in this way, then it may need new event attestations to be installed on the device in order to be able to re-register for a service again, as the previously installed event attestations may have been deleted when registering for the previous service as discussed above. Therefore, the rebirth request sent by the service provider may comprise at least one rebirth event attestation attesting to occurrence of at least one event, and in response to the rebirth request, the processing circuitry may store the at least one rebirth event attestation to storage circuitry for generating the attestation information for a subsequent validation request.

The event attestation included in the rebirth request need not be the same as the original event attestations which were held by the device when originally registering for the service. For example, while the device may have held many event attestations before the previous registration, if these were all deleted then the service provider may only be able to deduce that the events which that service provider required for enrolment to its service have all taken place, but may not be able to attest to whether any other events not required for access its own service have occurred. Hence, after rebirth the device may not have the same capabilities to enrol for different services that it did originally. Nevertheless, it can be useful to allow such a rebirth events so that a device can be enrolled again if it passes to a different user. In some instances, the rebirth event attestation may be such that effectively the device is limited to being re-registered with the same service provider as before (e.g. the service provider may trust its own event attestation that the device previously met the requirements for that service and so can re-enrol the device again for a subsequent attempt, but other service providers may not be willing to trust an attestation provided by another service provider).

A method for manufacturing or adapting a batch of electronic devices may comprise causing a predetermined event to be performed for each of the batch of devices, and storing an event attestation in each of the batch of devices, the event attestation comprising a cryptographically authenticated attestation to the occurrence of the predetermined event, wherein the event attestation is cryptographically authenticated using the same cryptographic key for each of the batch of devices. By making the cryptographic authentication of the event attestations device-independent, this can greatly simplify the manufacturing process. The event attestations for the batch could be the same for each device, or could include some device-specific information.

In some cases one manufacturer could inject more than one event attestation in each of the batch of devices, for example if one manufacturer performs multiple different processing steps on the same batch of devices. Each of the injected event attestations could correspond to one event. It is possible to provide more than one event attestation corresponding to the same event performed during the lifecycle of the device. For example, separate event attestations could attest to the fact that a certain event (e.g. the installation of software) started, and that that same event finished.

The event attestation may comprise pre-prepared information which is generated independently of any information read from the electronic devices. This means the communication from the manufacturing equipment to the electronic devices can be one-way and there is no need to consider any response from the electronic devices.

The methods discussed above may be performed under control of software executing on a data processing apparatus. Hence a computer program may comprise instructions for controlling a data processing apparatus to perform any of the methods discussed above (including the validation method at the validation apparatus side, the method performed on the electronic device itself for validating newly installed attestations and/or making the request for access to a given service, and the manufacturing method performed at the manufacturing equipment). The program can be stored on a recording medium. The recording medium may be a non-transitory recording medium.

FIG. 1 shows an example of a multi-stage manufacturing process for manufacturing electronic devices, involving a number of different device manufacturers or adapters 0, 1, 2, 3. Each manufacturer or adapter performs one or more events A-F on a given batch of devices. In general, an event may comprise any action performed on a device by a manufacturer/adapter, for instance the installation of a particular hardware component (such as a system on chip or security module), the installation of software on the device, the testing of the device using some test procedure or quality assurance programme, the activation of a particular device mode, recording of information about the device with a third party server, etc. The manufacture of a given batch of devices involves multiple stages which may be performed by different parties. For example batch 0 in the example of FIG. 1 undergoes events A, D and E, with event A performed by manufacturer 0 and events D and E performed by manufacturer 2. Batch 1 undergoes events A and F performed by manufacturers 0 and 3 respectively. Batch 2 undergoes events B, C and F with events B and C performed by manufacturer 1 and event F performed by manufacturer 3. Hence, different batches of devices may take different routes through the manufacturing chain, even if the batches are processed in common by a particular manufacturer at a particular stage of the process (e.g. batches 1 and 2 are both processed for event F by manufacturer 3 even though they went through different manufacturers earlier in their lifecycle).

Figure 2:
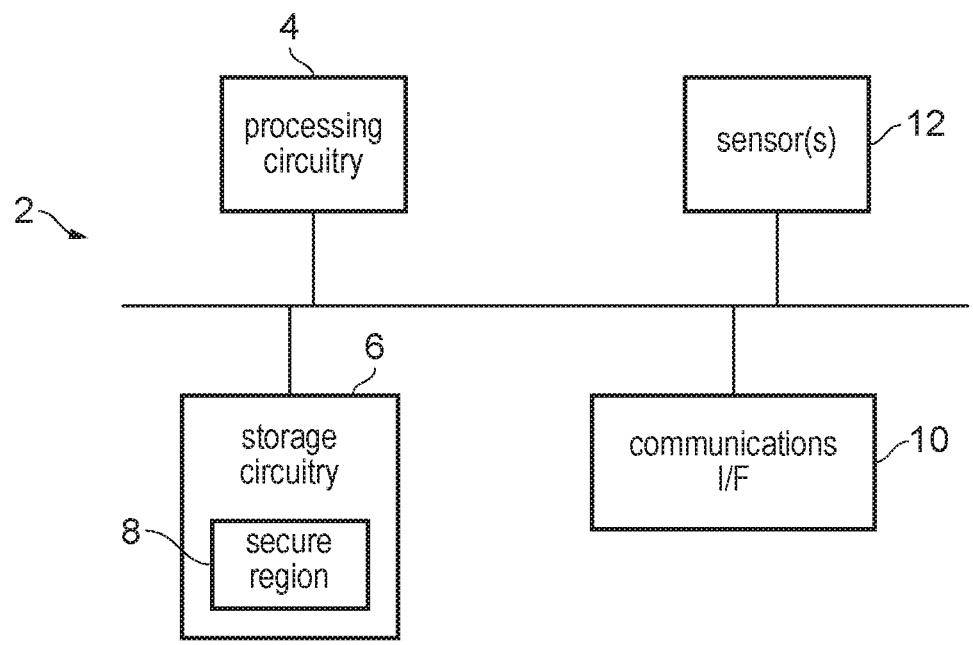
FIG. 2 schematically illustrates an example of an electronic device.

FIG. 2 shows an example of an electronic device 2. The device has processing circuitry 4 for performing data processing in response to program instructions, storage circuitry 6 for storing data and instructions to be processed by the processing circuitry 4. The storage circuitry 6 may have a secure region 8 which is protected by hardware mechanisms (e.g. using memory protection units or security mechanisms providing a trusted execution environment) or by software mechanisms (e.g. encryption), so that data stored in a secure region 8 is inaccessible to software not executing within the trusted environment. The device 2 has a communications interface 10 for communicating with external devices. For example communications interface 10 could use any other range of different communication protocols, such as WiFi®, Bluetooth®, ZigBee®, etc. The device may have one or more sensors 12 for sensing certain external conditions such as temperature, pressure, the proximity of a nearby user, etc. The specific sensors 12 provided may depend on the purpose of the device. It will be appreciated that FIG. 2 is merely an example of possible hardware that may be provided in the device and other components may also be provided. For example, some devices for which user interaction is expected may be provided with a display and/or a user interface module in order to display information to the user and receive input from the user. Other types of devices may simply be sensors which capture data and transmit the data to an external device and so these types of devices may not need a user interface or display. The validation apparatus described below may have a similar configuration to the one shown from the electronic device in FIG. 2, although the processing circuitry 4 of the validation apparatus may be more powerful than the processing circuitry in the electronic device and the storage 6 may be provided with greater storage capacity.

Figure 3:
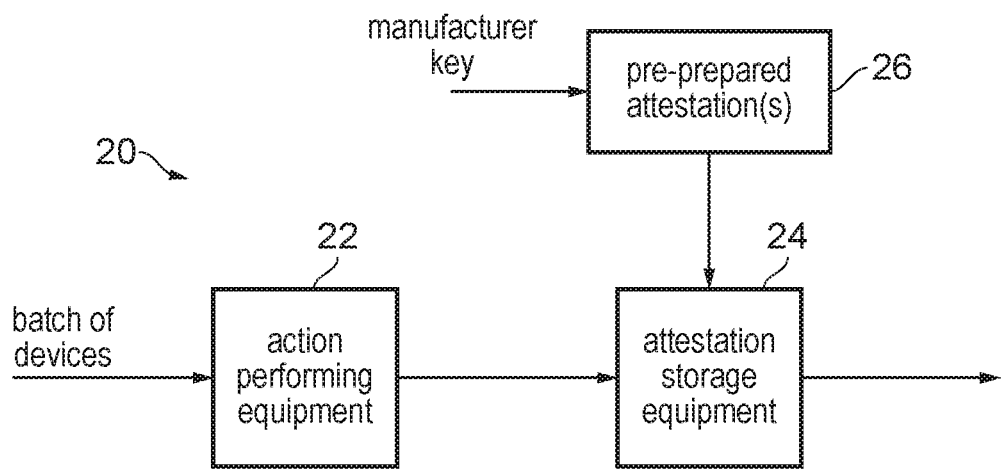
FIG. 3 illustrates an example of manufacturing equipment for performing at least one stage of the manufacturing process.

FIG. 3 shows an example of manufacturing equipment 20 provided by a given manufacturer or adapter. The processing line for processing a batch of devices includes action performing equipment 22 for performing some predetermined action on each of the batch of devices. For example the action could be installing software, making or installing a hardware component, testing the devices, etc. The batch of devices is passed to attestation storage equipment 24 which stores into each of the batch of devices one or more pre-prepared attestations 26 attesting to the fact that one or more predetermined actions have been performed by the action performing equipment 22. The pre-prepared attestations may be prepared offline and may be signed with a manufacturer key associated with a manufacturer or adapter performing the relevant action. If multiple events are performed by the same manufacturer, then multiple attestations may be injected, each attesting to one of the events. While FIG. 3 shows the attestation storage equipment 24 processing the devices after the actions have been performed, the attestations could also be injected before the action is performed or at the same time. While FIG. 3 shows a batch of devices progressing from the action performing equipment 22 to the attestation storage equipment 24, it will be appreciated that processing of the devices may be pipelined, so that some of the devices may be at the attestation storage stage 24 having the event attestations injected while other devices of the batch are still at the action performing stage 22. Also, in some cases the action performing equipment and attestation storage equipment may be the same equipment, for example when installing a piece of software the corresponding event attestation could be installed at the same time.

Figure 5:
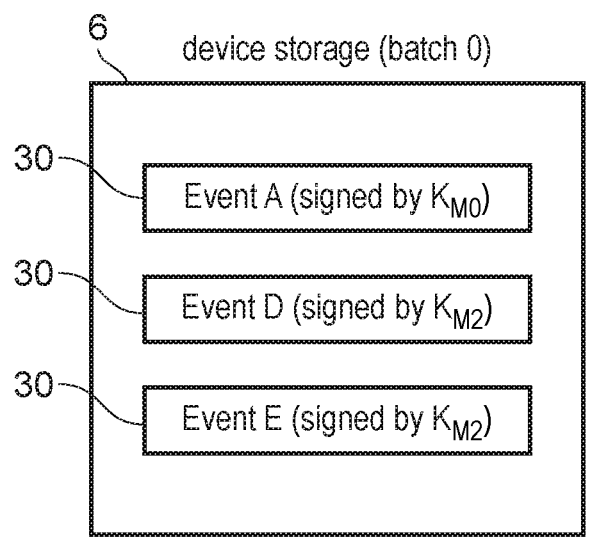
FIG. 5 shows an example of a number of event attestations stored by the device.

Each attestation is a cryptographically authenticated attestation attesting to the fact that a given event has been performed. The attestations are also referred to as "holograms" in the examples below. As the electronic device moves through the chain of manufacture as in the example of FIG. 1, each significant event in the devices lifecycle is marked with the installation of a given event attestation. Which particular events are considered significant enough to justify installation of an event attestation may depend on the particular application for these devices. The framework discussed below can be applied to a range of applications and services, and so the particular events recorded with the attestations may vary from application to application. Hence, as shown in FIG. 5, a device moving through the manufacturing chain may build up a collection of event attestations 30 for a number of events. For example batch 0 in the example of FIG. 1 may end up having event attestations 30 corresponding to events A, D, E. The event A attestation is signed by the manufacturer key $K_{M0}$ associated with manufacturer/adapter 0 while the attestations for events D and E are signed with the key $K_{M2}$ associated with manufacturer/adapter 2.

Figure 4:
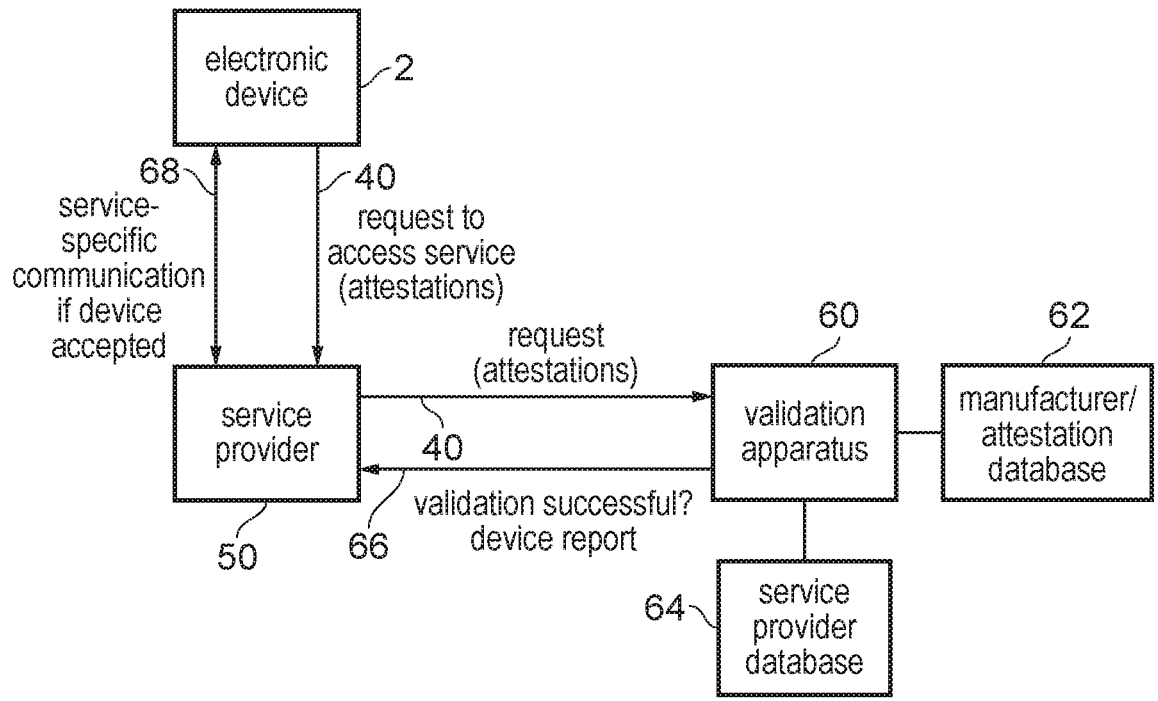
FIG. 4 illustrates a technique for determining whether an electronic device is allowed to access a service, based on event attestations embedded in the device to attest to the occurrence of corresponding events during the lifecycle of the device.

As shown in FIG. 4, the electronic device can use these attestations when seeking access to a given cloud service. The electronic device issues a service access request 40 to a service provider 50. The request includes a subset (or all) of the event attestations stored in the device storage 6. The service provider 50 forwards the request to a validation apparatus 60 which is responsible for checking the event attestations to determine whether they meet certain requirements. In particular, the service provider 50 may require that certain events have occurred during the lifecycle of the device in order for the device to be accepted for access to its service. The validation apparatus 60 may maintain a manufacturer/attestation database 62 which records information about validly cryptographically authenticated attestations for particular events. Some events may be allowed to be performed by more than one manufacturer, and in this case there may be multiple different attestations which may each be considered valid for that event, signed by different manufacturer keys. The attestation database 62 may also include lists of revoked attestations or information about allowed usage limits for attestations. The validation apparatus 60 may also have access to a service provider database 64 which may record the requirements of different service providers 50 with which the validation apparatus 60 may communicate. For example each service provider may specify what events are required for it to accept an electronic device for access to its servers, or any other criteria to be checked before a device can access its service.

The validation apparatus 60 validates the device request 40 by comparing the provided attestations with the information in the attestation database 62 and a service provider database 64. Validation is unsuccessful if the device 2 is unable to provide a correct cryptographically authenticated event attestation for each event required by the service provider. If validation is successful, then the validation apparatus 60 returns a message 66 to the service provider 50 to indicate that the device can be accepted for the service. This message may be accompanied by a device report which may provide certain information about the device which has been extracted from the attestations provided with the request 40.

Alternatively, there may be no service provider database 64, and rather than indicating whether validation is successful, the validation response 66 provided by the validation apparatus 60 could simply be an assertion that the event attestations are well formed (and optionally, that they convey particular information). In this case, it could be up to the service provider 50 to determine, given that the attestation is valid, whether any other requirements are satisfied to enable access to its service.

While FIG. 4 shows the service provider 50 and validation apparatus 60 as separate devices, in other examples the validation of the device request 40 may be performed by the service provider 50, and so the devices 50 and 60 can be combined. Hence, in general the functions of validating well formed event attestations (checking signature, etc.), parsing the meaning of the attestations, comparing that information with the requirements for a particular service provider and deciding whether to enable access to the service by the device 2 are all functions that may be provided by the service provider 50 or a validation apparatus 60 or by another actor entirely.

If validation is successful, then the service provider 50 and electronic device may then engage in service-specific communication 68. For example the device 2 and service provider 50 may establish device-specific key material for protecting subsequent communications with the service provider 50, or could establish other information specific to a particular service for which the device is to access.

Some specific examples of the described techniques are discussed below. It will be appreciated that the invention is not limited to these particular examples. This technique relates to recording and attesting information about a device's lifecycle, in particular the manufacturing process through numerous steps. We later enable a web service to attest that the device went through these steps. The technique also extends to provisioning the device with a Root of Trust and other information. We also support the secure re-provisioning of the device in a way that does not allow the device to be tracked between owners.

A KPH/Attestation system enables a factory to attest that a device is 'born' and later have a web service confirm the device was born in a 'good' factory. In a KPH (key provisioning host), a key is generated on the device/injected into the device, and that key is made known to the attestation service (validation apparatus) 60. This enables the service to later confirm that a message originated on the device (as only it knows the key). We can use this mechanism to prove to the validation apparatus 60 that messages (and in particular holograms) originate from a given device. This technique extends those concepts to a multi-stage manufacture/lifecycle. A device may be created, specialized multiple times and then 'used'. The technique provides a means to validate all the steps that were attested during the device lifecycle. The KPH enables the later lifecycle steps (holograms) to be remembered only on the device, avoiding the need for communication with the back end at that time.

Further, the technique does so by a means that minimizes the amount of on-line communication required by the device. We arrange that the initial 'creation' may take place with either no communication with the back end web system, or with delayed/batched communication. We further arrange that any lifecycle steps can be recorded with no network access required.

The technique also provides means for a device history to be discarded/forgotten, but for key aspects to be selectively remembered—for example keys/identities related to a previous user of a medical device may be securely discarded, whist recording that the device has been used 'n' times (this is done by discarding holograms and/or replacing them with others, for example one indicating use 'n' times).

The technique enables all of this using a small amount of storage/processing making it suitable for IoT or other constrained devices.

The technique also reduces the load placed on a factory by minimizing the amount of cryptographic or other processing needed per device, and enables flexible tradeoffs in security/performance.

The technique also provides a means for detecting fraud in the system.

The system uses the following features:

A device identifier and related secret (key).

Attestations made by a factory are stored on the device, protected by the key, rather than being sent to an external server.

Attestations are protected by a signature but are structured in such a way as to support off line generation of attestations, and batch attestations (e.g. an attestation used on 1000 devices)

Attestation storage and transmission is achieved using a very efficient scheme.

Fraud detection is enabled by included expected usage information within attestations, so that abuses can be spotted. (for example 'this attestation may be used exactly once')

Further features are discussed below:

1) Information is collected about more than one stage of a device manufacture, to enable a server to attest that these stages all took place 2) The entities responsible for each stage of the manufacture do not need to trust each other a. The ultimate device authority [device Directory or validation apparatus 60] needs only a relationship with each manufacturing entity b. The device does not need to trust any entity 3) The second and subsequent entity responsible for a stage of manufacture a. do not need a network connection b. do not need to generate device-specific information c. do not need to perform cryptographic processing during or after production d. do not need secure storage of device specific records/receipts—though they should store 'holograms' and prevent their theft. Typically, there are far fewer holograms than devices, so these storage requirements are more modest.

e. Need only a single stage 'push' of information to each device, rather than a 'query' or more complex device interaction. This is therefore faster and more amenable to integration in a factory workflow.

4) An attacker/rogue entity a. . . . who successfully attacks one entity cannot impersonate another b. . . . who steals secrets from one device cannot impersonate another, or replay that information at a second device 5) The central server can detect fraud a. If factory generated 'holograms' are reused more times than permitted b. If a claimed lifecycle is invalid 6) A device that is recycled a. cannot be linked to its previous life b. Retains security related properties 7) A manufacturing entity does not need to disclose [to anyone] how many device have been produced, until those devices are 'born'

We protect the device lifecycle through several stages

1) Creation

The core device is created. This may be a SoC in a silicon factory, a fully assembled device or something in between. The earlier in the device lifecycle we can be involved, the more of its lifecycle we can protect.

2) Adaptation

This is a significant event during device manufacture. An example might be a SoC being embedded into a component by an ODM, a device passing through a QA step, or some software being provisioned on the device.

3) Birth

This is the nominal first use of the device where we want its 'creation story' to be attested to some 3rd party. A concrete example might be an IoT device first connecting to its back end cloud service and wishing to prove it is legitimate. At this point we also provision information for use during the 'Life' stage 4) Life This is where a device is used, and wishes to attest user or account specific features.

5) ReBirth

Devices get re-used, and at this point any previous history from the 'Life' section may need to be forgotten in a secure way. This invention includes means for doing this to ensure a 'reborn' device is as new as a 'born' one.

Creation

For device creation, we propose to leverage existing techniques or variants of them to give each device a unique identifier and private key. The corresponding public key is stored in a web service (Device directory 60). There are existing means to achieve this, to which we add a new approach—the (device id, public key, device attributes) tuple can be signed by the factory to indicate that it was created in a known location. And then the signed tuple can be stored on the device itself, rather than being sent to Device directory 60 at this stage.

During device creation, the device creates (or is given) a private key that cannot be read or modified by other software on the device, or by 3rd parties/other factory equipment. There are existing well known means to achieve this. The device has a small amount of secure storage that can be used to store information that cannot be read/modified by 3rd parties. (A 3rd party may be able to wipe this information, but not retrieve it or modify it in other deterministic ways).

Figure 6:
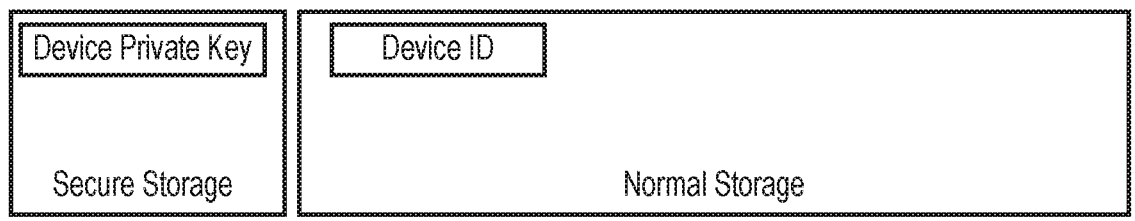
FIG. 6 shows an example of information stored by the device after creation.
Figure 6:
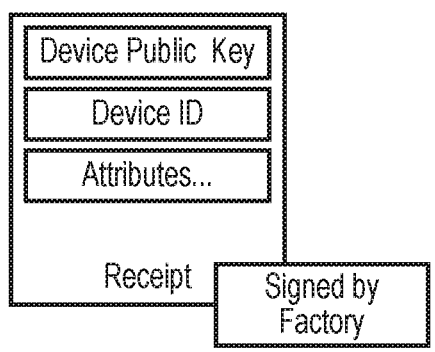

After creation a device contains the information shown in FIG. 6. Note that secure storage may be formed by storing the majority of data in regular storage, encrypted or otherwise protected by a key which is it stored in secure storage. Anything stored in normal storage could be also be stored in secure storage. A receipt providing the device public key, device ID and any other device attributes, signed by the manufacturer key, may be stored on the device, or transmitted to Device directory 60 out of band.

Adaptation

At the adaptation stage a factory (for example a ODM) wishes to create an attestation for the device—for example indicating that a subsequent manufacturing step has been completed, such as creation of a module by a specific factory.

A simple approach would be to create a second receipt and either send to Device directory 60 or store on the device. This is plausible—but creates a per-device expense that this technique can avoid. Instead we introduce the notion of a (virtual) hologram. Like their physical counterparts, these take the form of a pre-created entity that attests to a specific fact—i.e. that the device to which they are attached has a certain property. Unlike the receipt, the hologram has the advantage that it can be created in advance and away from the manufacturing line. Further, we structure holograms in such a way as to achieve certain properties A hologram can be used multiple times by a factory, up to a pre-set limit A hologram cannot be removed from a device and reused en-mass, even using exotic techniques such as X-ray scanning.

Holograms can be reported stolen and not used.

Fraudulent use of holograms can be detected

Validation of a hologram is in two phase—a quick on device phase in the factory, and a later on line check during device 'birth'.

Holograms are stored on the device to avoid the need for network access

The hologram format is as follows (this is just one example format, other examples could comprise a stub that can be validated on the device and then discarded, and a signature to prove the hologram was created by a known entity (key)):

(Ticket-Stub, Hologram ID, Assertion, Hash, Signature)

Ticket Stub: This is a random identifier which is bound to the hologram Hash. The ticket stub is required on a 'fresh' hologram in order for it to be accepted by a device but is then discarded so that a hologram recovered from a device cannot be reused.

Hologram ID: This is an unique identifier for each minted hologram, and allows Device directory 60 to monitor usage and ensure this is within expected bounds.

Usage Count [optional]: How many instances of this hologram ID are allowed. Alternative is to assume this information is stored on Device directory 60.

Assertion: A compact (binary/text) description of asserted attributes in a standardized form. Will include an indication of the factory/entity making the assertion.

Hash: A secure hash of the ticket stub, hologram id and assertion to allow rapid on device validation that a hologram is well formed. The hash is stored in secure storage on the device (other parts are stored in normal storage).

Signature: A signature over the Hologram ID, Assertion and Hash created using the Factory's private key. This proves that the hologram was created by a known entity (Factory) and has not been modified. The signature does not cover the Ticket Stub, as it is discarded before the signature is checked. However it does include the hash, so it is not possible for an attacker who has retrieved a hologram from a device to recreate the stub.

Figure 7:
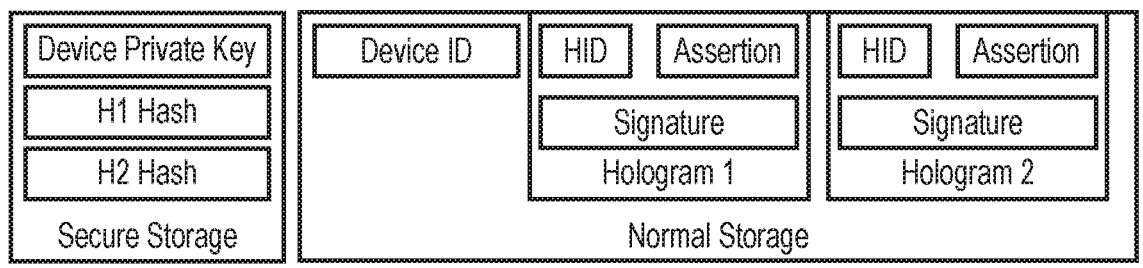
FIG. 7 shows a more detailed example of event attestations stored by the device.

At each adaptation state, the relevant hologram is stored on the device. After two such stages the device contents might be as shown in FIG. 7.

Figure 8:
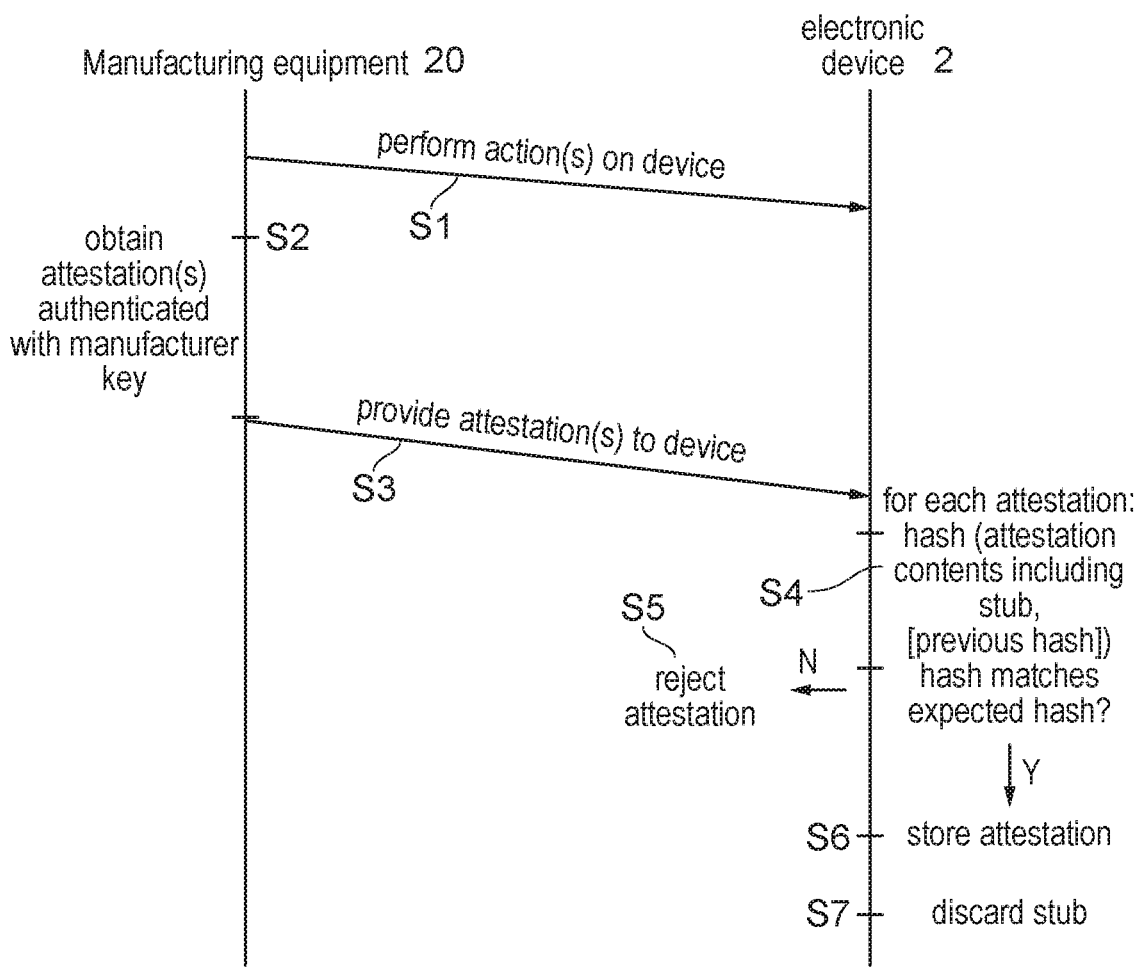
FIG. 8 shows embedding of an event attestation in the device during an adaptation phase.

FIG. 8 shows an example of processing at the Adaptation stage for a given electronic device 2. At step S1 the manufacturing equipment 20 performs one or more actions on the electronic device 2. At step S2 one or more attestations (holograms) for at least one of the performed actions are obtained, each attestation authenticated with a cryptographic key associated with the manufacturer or adapter who performed the action. A single hologram may indicate that multiple actions have taken place. The action may not be a physical action—e.g. some attestations may simply attest that the device passed through a particular manufacturer ("device was here"). The attestations could be pre-prepared attestations used for an entire batch of devices, or could have some device-specific material. At step S3 any obtained attestations are provided to the device (alternatively, each attestation could be provided one at a time in separate transmissions). For each attestation, the device 2 performs a validation check to determine whether the attestation is well formed. At step S4 the device 2 generates a hash value by applying a cryptographic hash function to contents of the attestation, including the stub portion. Optionally the values used as inputs to the cryptographic hash function may also include a hash function associated with the most recently installed attestation held by the device (see more detail below). The device 2 determines whether the result of the hash function matches the expected hash value associated with that attestation. If the hash result does not match the expected hash value, the attestation is rejected at step S5. If the hash result does match the expected hash value, at step S6 the attestation is stored to the storage circuitry 6 of the electronic device 2. At least the Hash value associated with the stored attestation is stored to a secure storage region. At step S7 the stub portion of the attestation is discarded (the stub portion is not stored to the storage circuitry of the device 6). If multiple event attestations are received from the manufacturing equipment 20, steps S4-S7 are repeated for each of the attestations.

Birth

At the birth stage we wish to achieve some/all of the following
- Send the holograms (and Hashes) to Device directory 60 which can validate the signatures to confirm they are legitimate
- Parse/expand the binary information stored in the holograms to make it more digestible to a 3rd party service
- Inform a 3rd party service that the device is legitimate/has a known lifecycle with specific assertions
- Recover storage on the device that was used for assertions
- Generate a new device ID and private key to be used during the application life
- Discard the original device key and identity The proposed flow involves the device, 3rd party service that will manage the device and Device directory 60. There are other equivalent flows.
- The device initiates the flow by creating a message containing all the holograms, and hashes together with the device Id and signing this message using the device private key.
  - Various well known schemes can be used to also encrypt this data if required
  - The message can also contain a timestamp or other metadata to mark it as 'fresh'
  - The message can also contain a freshly generated public 'transport' key (T)
- The message is passed to Device directory 60, either directly, or (more likely) via the 3rd party service
- In one implementation, the device directory 60 validates
  - The signature matches the public key stored for this device id
  - The hologram signatures are all correct (and were generated by the appropriate keys)
- Device directory 60 then generates a report containing the Attestation details,
  - This may be in either in binary or parsed/expanded form.
  - The report may also contain information about hologram use (see below)
- The report is passed to the 3rd party service.
- The 3rd party service can validate that this device is one it wishes to use.
- The 3rd party service can then generate any keys/identities/other messages it wishes to send to the device to identify it in future
- The 3rd party service then encrypts this data using the transport key (T) and sends it to the device.
- Upon receipt and successful decrypt of this message the device
  - Stores any new IDs/keys/data related to this service
  - Optionally deletes the holograms and/or device id and/or device private key
  - Note the device id/key may be retained in order to enable additional life cycle events, such as maintenance to be recorded and later attested by Device directory 60 in an analogous way to pre-birth events.
- Note that Device directory 60 never learns of the 3rd party specific device ids/keys/other data.

This is just one implementation and other implementations are also possible.

During the 'Birth' phase, Device directory 60 can keep a count of each unique hologram it sees, and report this usage back to the 3rd party service. For example, if by agreement each hologram for a certain attestation should only be used on 100 devices, then if 1000 instances of the hologram are seen, this indicates fraud has taken place. Though this is not sufficient to detect which devices are fraudulent and which are legitimate, it does give a useful indication and enables external action to be taken (e.g. audit of factory).

Holograms can be released to a factory/production line in batches, each batch being differentiated by having a different Hologram ID or by other means. If it is later discovered that a batch has been stolen, then Device directory 60 can be informed and revoke the holograms, but recording the stolen batch and refusing to enable devices from this batch to be 'born'.

Figure 9:
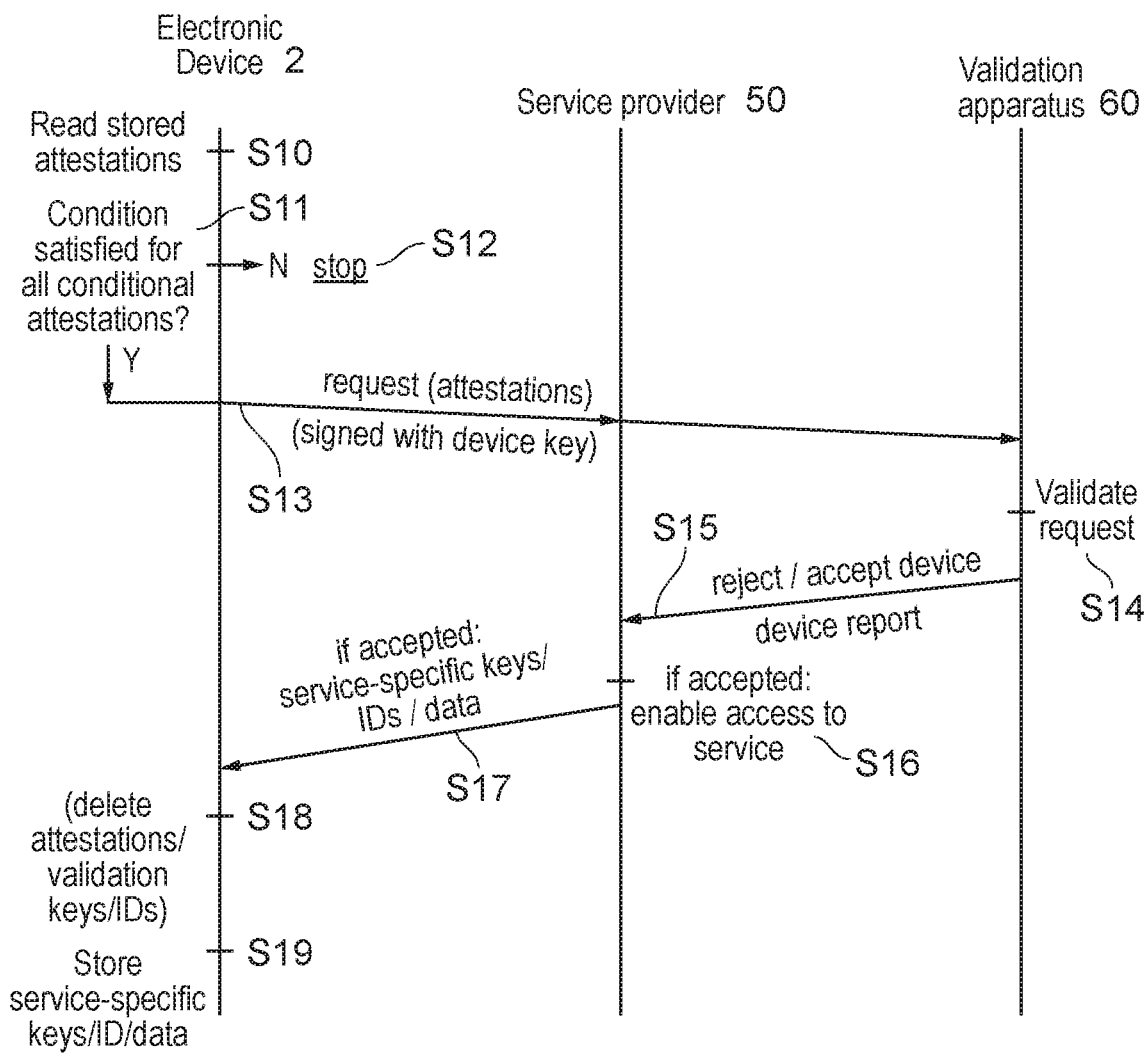
FIG. 9 shows a birth phase when the electronic device is validated based on the event attestations.

FIG. 9 shows an example of processing performed by the Electronic device 2, service provider 50 and validation apparatus 60 at the Birth phase. While FIG. 9 shows communication directly between the electronic device 2 and service provider 50, it is also possible for the electronic device 2 to communicate with the service provider 50 via an agent device (e.g. a computer, laptop, tablet or smart phone) which acts as an intermediary. For example, this could be useful for use cases where the communication functionality of the electronic device 2 may not yet be fully operational at the time the Birth phase is performed (activating full communication functionality may be part of the actions performed if the device 2 is accepted for the service), or if the device 2 itself does not have any communications capability of its own (e.g. a peripheral).

At step S10 the electronic device 2 reads at least a subset of the stored attestations (holograms) from its storage circuitry 6. If it is known which particular attestations are required for accessing a given service provider, it is possible for the device 2 to read a subset of the stored attestations, and to omit other known not to be needed from the subsequent request. However, in many cases it may be simpler for the device to read all the stored attestations and include them all in the subsequent request, and leave it up to the validation apparatus 60 to decide which event attestations are relevant to a particular service.

If any of the stored attestations is a conditional attestation, then at step S11 the electronic device 2 determines whether the associated condition is satisfied. For example, the device 2 may check whether the result of hashing contents of a specified memory region matches an expected hash value, to check whether a required piece of software is still installed at that memory region and has not been modified (see the advanced memory holograms discussed below). Other conditional checks could be that the device is operating in a given mode of operation (e.g. a secure mode). If the condition associated with any conditional attestation is not satisfied, then at step S12 the method ends and no request is transmitted. If the condition is satisfied for all the conditional attestations, then the method proceeds to step S13 (in an alternative approach, the method could still proceed to step S13 in the event of a failed attestation, but any event attestation whose condition is failed may be omitted from the subsequent request, so that a failed conditional event attestation does not prevent access to a service if that attestation is not a required event attestation for that particular service).

At step S13 the device 2 transmits a request to the service provider 50, specifying all, or a subset of, the event attestations stored in the device 2. The request is signed using the device key allocated to the device in the Creation phase. The request is forwarded to the validation apparatus 60 by the service provider 50. At step S14 the validation apparatus 60 performs a validation process to determine whether the request meets the requirements for accessing the service. The validation process is described in more detail with respect to FIG. 10 below. At step S15, the validation apparatus 60 returns a message to the service provider 50 indicating whether the validation of the attestation was successful (i.e. that the holograms were not forged). Optionally a device report may also be transmitted to the service provider 50, summarising information extracted from the event attestations. The validation apparatus 60 and/or the service provider 50 may decide, when validation of the attestation is successful, whether to accept the device 2 for access to the service (e.g. there may be other criteria to check, not just that the event attestations are valid). If the device 2 is accepted for access to the service, at step S16 the service provider 50 enables access to the service (e.g. registers the device as a valid device, or carries out other operations for preparing the device for use in conjunction with the service). In some cases, in addition to the validation based on the event attestations, the service provider 50 could also provide other checks before accepting the device for access to the service (e.g. authenticating the user of the device using user identifiers, passwords, etc.). If the device 2 is accepted, at step S17 the service provider 50 provides the device with any service-specific information to be stored on the device (e.g. device identifiers, keys or data to be used by the device to access the service). At step S18 the electronic device 2 deletes one or more (or all) of the event attestations stored in the device storage 6, validation keys used to encrypt the messages exchanged with the service provider 50 during the Birth phase, and/or device identifiers used to identify the device during the Birth phase. At step S19 the electronic device 2 stores any new service-specific keys, identifiers or data received at step S17 (or generated within the device 2 itself), for use when subsequently accessing the service. The device 2 is now ready for access to the service.

Figure 10:
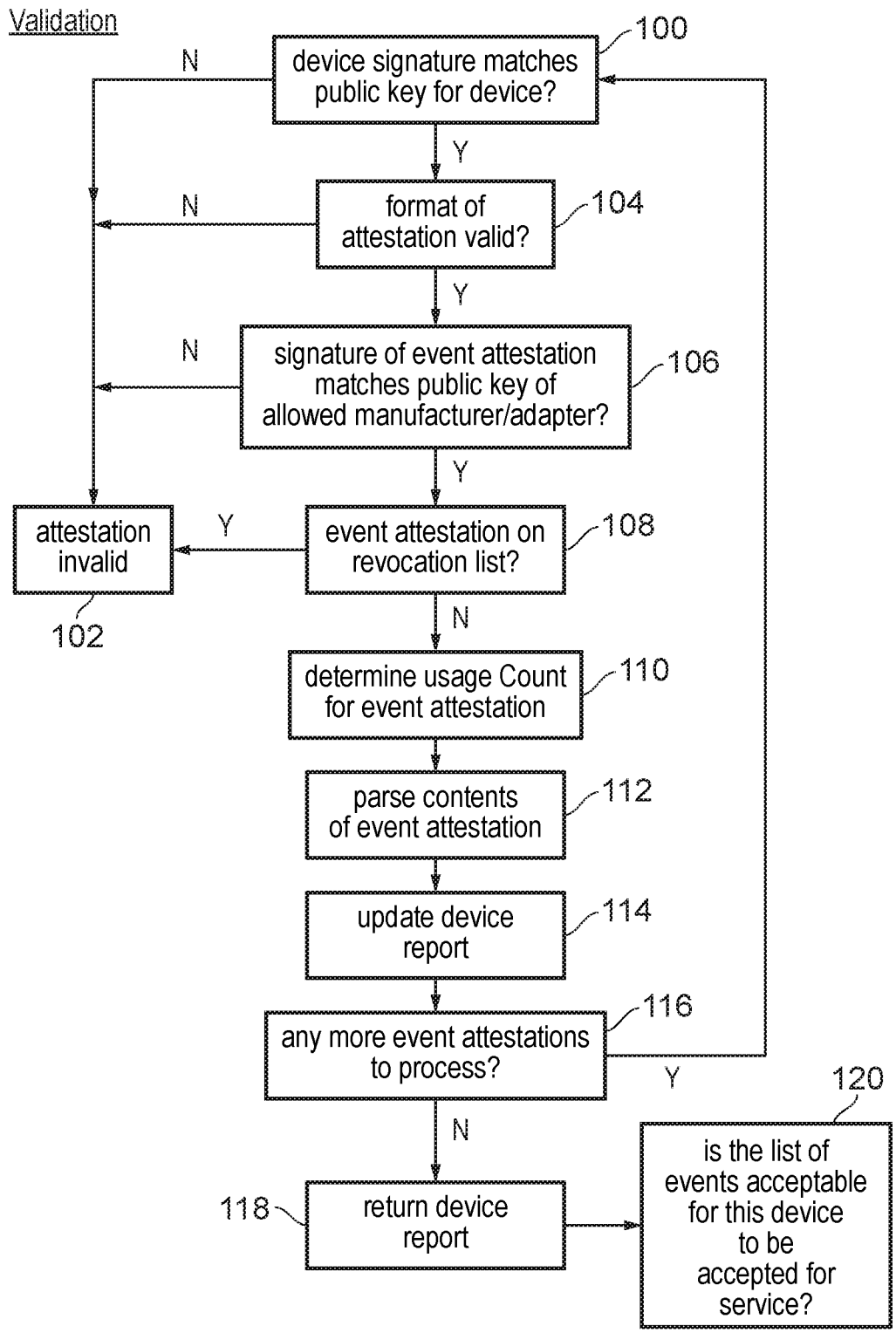
FIG. 10 is a flow diagram illustrating a method of validating the electronic device during the birth phase.

FIG. 10 is a flow diagram illustrating steps that may be performed by the validation apparatus 60 and/or the service provider apparatus 50 to validate the device request 40 based on the event attestations. For example, the steps of FIG. 10 may be performed at step S14 of FIG. 9. Which particular steps are performed at the validation apparatus 60 and the service provider apparatus 50 is an implementation choice.

At step 100 the validation apparatus 60 or service provider apparatus 50 determines, for one of the event attestations received from the electronic device 2, whether the device signature associated with the request matches a known public key for the electronic device 2. For example the public key may be obtained from a certifying authority or may be associated with a device certificate of the device. If the device signature does not match then at step 102 the attestation is determined to be invalid.

At step 104 the validation apparatus 60 or service provider apparatus 50 determines whether the format of the event attestation is valid, and if not then at step 102 the attestation is determined to be invalid. At step 106 the validation apparatus 60 or service provider apparatus 50 checks whether the signature of the event attestation can be validated using a public key of one of the allowed manufacturers or adapters who are allowed to perform the corresponding event on electronic devices. For some events, there may be only one manufacturer or adapter allowed to perform that event. However, often there may be multiple allowed manufacturers/adapters for a given event, so the signature could be validated using two or more keys associated with different manufacturers/adapters. If the signature of the event attestation cannot be validated using any allowed manufacturer/adapter key, then again the attestation is determined to be invalid at step 102. In practice, to avoid having to attempt validation using every possible key, the event attestation may include key identifying information to identify the manufacturer key that should be used to validate the attestation.

At step 108 the validation apparatus 60 or service provider apparatus 50 determines whether the event attestation is on a revocation list of a revoked attestations which can no longer be accepted. Event attestations can also be revoked for a number of reasons, e.g. because a key was leaked, or the signing algorithm used to create the attestation is no longer deemed secure, etc (hence even a non-fraudulent device which went through the valid manufacturing process may still sometimes receive an error when it attempts to access a service, because its event attestation has been revoked for reasons outside its control). If the event attestation is on the revocation list then again the event attestation is determined to be invalid at step 102.

At step 110 the validation apparatus 60 or service provider apparatus 50 determines a usage count for the event attestation, i.e. how many electronic devices have already used the event attestation associated with a particular event in previous validations. In some cases, the validation apparatus 60 or service provider apparatus 50 could check whether the number of uses is greater than a certain threshold number, and reject the event attestation as invalid if the usage count is greater than the threshold. For example the maximum number may be recorded in the manufacturer database 62 or could be extracted from the event attestation itself as provided by the electronic device. A counter may be maintained by the validation apparatus 60 or service provider apparatus 50 to track the number of devices which have already used the attestation for event X. The maximum number could for example correspond to the number of devices in the batch of devices which were manufactured with that particular event attestation. If more than this number of devices are detected to be using the same event attestation then a fraud attempt can be identified and that attestation could be added to the revocation list. In other examples, the validity of the event attestation may not depend on the usage count, but instead the validation apparatus 60 or service provider apparatus 50 could simply include the usage count in a device report to allow others to decide whether the usage count indicates an invalid usage.

At step 112, the validation apparatus 60 or service provider apparatus 50 parses the contents of the event attestation to extract any other information from the event attestation (e.g. information on the event that occurred, the manufacturer who performed it, etc.). At step 114, the validation apparatus 60 or service provider apparatus 50 updates a device report for the electronic device 2, to indicate whether or not the event attestation was determined to be valid or invalid, and indicate other information parsed based on the event attestation. The device report may include a number of entries each corresponding to one of the event attestations transmitted from the electronic device and validated by the validation apparatus 60 or service provider apparatus 50. At step 116, the validation apparatus 60 or service provider apparatus 50 checks whether there are any more event attestations remaining to be processed, and if so then the method returns to step 100 to validate the next event attestation. When all event attestations have been processed, the device report is returned to the service provider 50 at step 118.

At step 120, the service provider uses the device report to determine, based on the list of events for which valid event attestations were identified in the device report, whether the device meets the particular requirements needed for it to accept the device for access to its service. In some cases, the service provider might accept two or more alternative sets of events (e.g. either events A, B, C or events D, E, F . . . ) as being valid (e.g. indicating two different manufacturing chains). Hence, the test applied by the service provider might include comparing the list of valid events against a simple list, a regular expression, or a more complex matching criterion.

Although not shown in FIG. 10, in some examples the validation apparatus or service provider may also perform a device attestation (e.g. by verifying a device signature using a device public key), to verify whether it should initially trust the event attestations. For example the validation request providing the event attestations may be collectively signed by a device private key injected in the device during manufacturing, and the device key could be verified using the public key associated with the device certificate. If the device attestation can be validated, then the validation apparatus or service provider may continue to validate the event attestations contained within the validation request.

It will be appreciated that not all of the validation steps of FIG. 10 need to be performed for a given embodiment. For example some implementations may not impose any maximum number of devices for a given attestation, or might not have a revocation list. Also, the steps could be performed in a different order to the ones shown in FIG. 10 or some of the steps could be checked in parallel. Also, some additional validation steps could also be provided, for example checking the sequence in which the events were performed on the electronic device as discussed below, or checking whether there are any suspicious timings of events using an audit log provided by the device as discussed below. It will be appreciated that FIG. 10 is just one example of a possible validation process using the event attestations.

In the example of FIGS. 9 and 10, the event attestations themselves are transmitted from the device 2 to the validation apparatus 60 or service provider 50 along with the validation request. However, this is not essential. For example, an alternative implementation would be for the holograms to be validated on installation by the device 2 instead of the validation server 60, for signatures to be discarded, and then, at birth, for the device to attest them to the server, by transmitting a single cryptographically authenticated attestation (signed by the device's public key) attesting that the device 2 previously received the set of event attestations (each signed by a corresponding manufacturer/adapter key) and that those event attestations were correctly validated on the device. That is, a device may attest to the validation apparatus that a given set of holograms (H1, H2, H3) was received.

Another option would be that the attestation information sent with the request S13 attests that the device 2 is a correct device, but does not explicitly identify the set of valid events which occurred for the device. For example, the device may initially know "I expect H1 or H2 next", and when it gets H1, H1 contains the info "either H3 or H5" next, etc. Hence, each hologram can specify information about what holograms are valid at the next stage, and so the device can then validate whether the next installed hologram is correct. If all the holograms so far comply with the expected chain, then the device may send a validation request S13 to the validation apparatus 60 or service provider 50 specifying an attestation (signed by the device key) that it has gone through a valid manufacturing chain (attesting "I am a good device"). At every stage, the device only knows what acceptable actions come next, but can attest to a server that it has/has not gone through a valid chain.

Rebirth

There may be a need to reuse devices and to forget some/all aspects of their past (for example who previous owners were). To do this the 3rd party service does the following It generates a hologram containing information that is to be retained (e.g. this device is good) and sends it to the device, to be processed as for the 'adaptation stage' (This message would normally be protected using a key provisioned at 'Birth')

It arranges for the device to discard all application level data/keys.

The device is now in a state that it can be 'born' again, with no prior knowledge about its previous life, other than that recorded in the rebirth hologram.

Note that during rebirth the device no longer has an entry in Device directory 60 so the message sent to Device directory 60 is not signed. This message must therefore by secured by other means, e.g. by encrypting using Device directory's public key. To prevent replay of re-birth messages, re-birth holograms would normally be limited to be single use, and Device directory 60 would maintain a list of all previously seen holograms.

Figure 11:
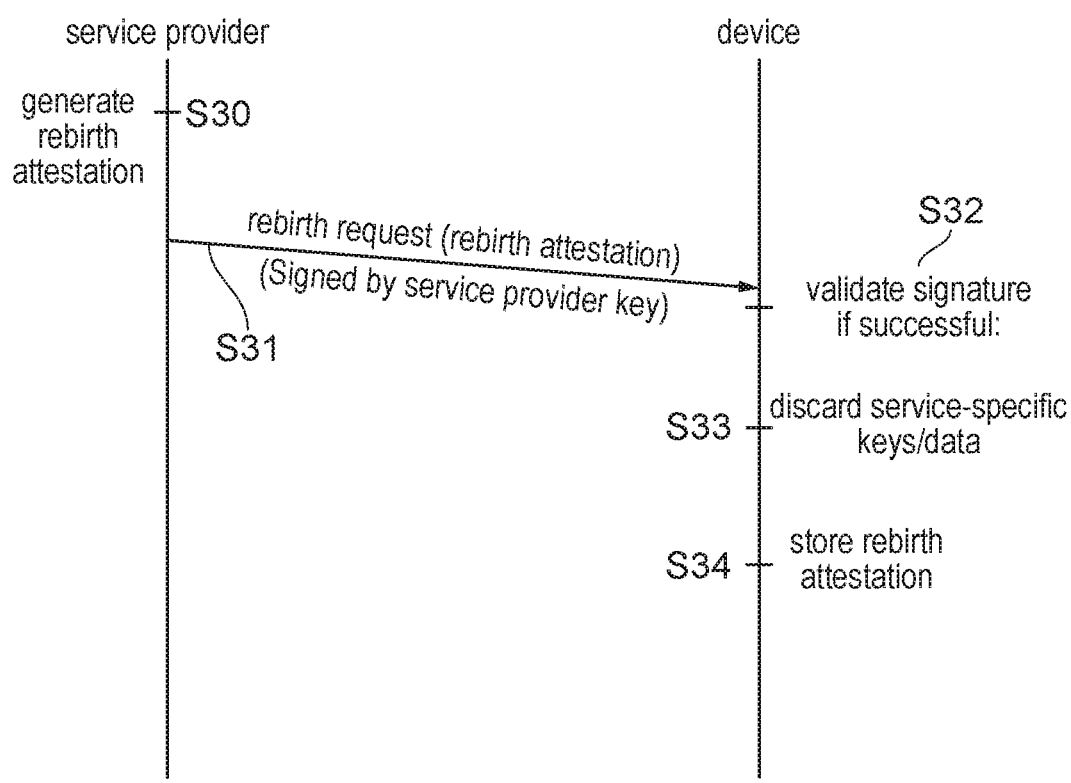
FIG. 11 shows a rebirth phase when a device previously validated for access to the service is restored to a state in which the device can re-register for the service.

FIG. 11 shows an example of processing performed between the service provider 50 and device 2 at the Rebirth phase. At step S30 the service provider 50 generates at least one rebirth attestation, attesting that the device has undergone a particular event. For example, the rebirth attestation could attest to the fact that the device previously was validated as meeting the requirements of that particular service (as the event attestations which were previously used to validate the device may already have been deleted as discussed above, the rebirth attestation may not be able to individually attest to each event). At step S31 the service provider 50 sends a rebirth request to the device 2, comprising the rebirth attestation. The rebirth request is signed with a cryptographic key (symmetric or private) associated with the service provider. At step S32 the device 2 validates the signature of the service provider using a corresponding service provider key (symmetric or public). If the signature validation is successful, at step S33 the device 2 discards any service-specific keys, identifiers or data associated with the access to the service in the device's previous life, and at step S34 the device stores the rebirth attestation. Although not shown in FIG. 11, the Rebirth phase may also include the service provider providing the device with a new temporary identity (identifier and Device key) similar to the Device identifier and key provided at the Creation phase, to allow the device to identify itself during a subsequent Birth phase. The device can now undergo another Birth phase to register again for a service.

Advanced 'Memory' Holograms

The Basic hologram scheme described above shows that the device passed some adaptation event.

A second form of hologram can be used to indicate that specific software was installed on the device.

This hologram is an extension of the first. Here the assertion is of the form

[Differentiator][Memory Start Address][Length][Expected Hashcode]

Where

Differentiator

This is a marker to indicate that this hologram is of the type 'Memory'. Alternatively the Marker may be indicated by a special Hologram ID Memory Start Address/Length This indicates a region of Memory Expected HashCode This indicates the expected value of a hashing the memory at in the specified location.

When processing this hologram during the 'Birth' phase, the device itself first validates that the memory range indicate contains the correct software (i.e. matches the expected hashcode) prior to contacting the server. In this case the device is attesting that the software is correct.

Linked Holograms

The following text describes an optional extension to the techniques described above.

When injecting the attestations (holograms) into the electronic device 2 during the various manufacturing steps, the holograms may be cryptographically chained together. This means at later time, the exact path the device took during ODM manufacturing can be assessed, and either rejected or accepted. A cryptographical binding may be provided between the imported holograms, which later can be attested or validated.

Furthermore, the linkage between the assertions can be inserted in a public record of sorts and the whole binding can thus be viewed as a blockchain. This means a verifier can attest the exact route the device took from first to last step. It can help with finding problems or other issues within a supply chain. Hence, the addition is that we make the holograms cryptographically bound and thus create a public ledger to attest this fact. It also means that the exact path the device took during manufacturing is asserted.

In one example, when the Hash $H_N$ is created for a later hologram corresponding to a later event performed on the device, it will also include the hash, $H_{N-1}$ of the previously installed hologram. For the first hologram there is no previous hash to use, so the Hash does not include any earlier hash. By doing so we will create a cryptographic chain of the holograms (and their order is now explicit as well).

During the Birth phase, the electronic device 2 may return the following information to the validation server 60:

signature(Hash1|Hash2| . . . | Hashn| nonceserver)–i.e. the signature of all of the hashes+nonce (freshness indicator) (alternatively, rather than sending all the hashes, a further hash of Hash 1, Hash 2, . . . , Hashn could be generated, and this single further hash could be transmitted instead of all of the individual hashes, so that less data is sent to the server).

Hologram1 . . . n

Hash1 . . . n

Device ID

The server 60 may pass down a nonce when communication with the electronic device 2 to be enrolled takes place, to ensure that the enrolment is fresh, and not a reply of a previous one, and this nonce is thus also returned in the signed response by the IoT device (use of such a nonce is also possible in the earlier examples discussed above).

The validation server 60 can check the returned "blob" of information to determine:

a) does this IoT device even exist? (using the device ID, which can be validated against the receipt from this IoT device) (which either is passed along at this time too, or previously out-of-band communicated to the server 60 from the factory 20).

b) is the returned blob of information fresh (by comparing the nonce in the returned blob with the nonce originally passed from the server 60 to the device 2)?

c) is its integrity valid? Has it been modified in transit? (by validating the signature).

When the server 60 receives all of the holograms (as well as other data), it can check ensure they are in the correct order (due to the event chaining described above), and for each hologram, it can check that the assertion in each is sensible (according to whatever policy it has). That means, if a rogue ODM tries to insert a hologram into an IoT device—the server will detect this as the assertion and the key signing it would not match what it expects.

To determine whether the chain of event attestations is valid, the validation server 60 may have access to data defining one or more of the following (or this could be out of scope, and handled by an OEM server instead):

What hologram servers exist and their public keys and assertions.

The path an electronic device 2 may legitimately take from its first step until birth. The path of how holograms might be linked is now mandated and the server should know this (or alternative paths the device 2 may take if multiple paths are acceptable), or for particular services/applications for which the path taken by the device does not matter, then the server can ignore this additional check.

Each manufacturer/adapter/factory's public keys or equivalent cryptographic keys for verifying the identity of the party providing the attestation. Hence, when an IoT device receipt is presented, it can only be validated if the attester's public key is known in advance (or it cannot trust that receipt).

Figure 12:
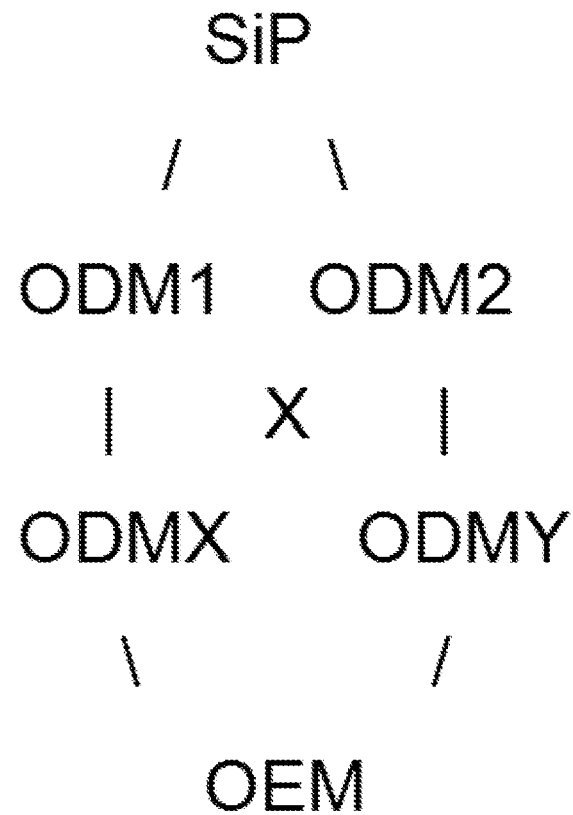
FIG. 12 shows the assumed topology (Direct Acyclic Graph—DAG) of the IoT device's creation.

The path that a device might pass through during its creation can be viewed as illustrated in FIG. 12.

That is, an IoT device can take several paths from the SiP until the OEM;

SiP→ODM1→ODMX→OEM

SiP→ODM2→ODMY→OEM

SiP→ODM1→ODMY→OEM

SiP→ODM2→ODMX→OEM

Whereas SiP→ODM1→ODM2→OEM is an illegal route and not allowed by the above policy (graph).

Further on the ODM rerouting issue, when an electronic device 2 passes through the various stages of production, each factory can use a hologram server for injecting the relevant hologram into the target electronic device 2. In each hologram, there is an assertion which can be said to identify the given factory (or stage), say "Suomi Factory #3—QA Passed". Because of the way each hologram is chained to the others when the IoT device passes through the various factory stages, the enrolment server (or at any future time), can validate the steps the device took until birth to ensure they were valid.

That is, if the factories an IoT device passed through were: SiP→ODMA→ODMB→ODMD→OEM, and ODMB was a blacklisted one, this would be detected by the enrolment server when it tries to verify the holograms, and as such can subsequently black list this electronic device and refuse it to be acknowledged. Also, it might not just be that manufacturer ODMB is "fraudulent", it might be that it is entirely unknown and thus should not be allowed in the chain of holograms. Similarly, if an expected hologram is missing from the desired path—i.e. in the example above, SiP directly links to the OEM—this is also an indication of a problem, as the device would not have passed through the required ODM steps during manufacturing as so outlined by the IoT device manufacturer (OEM).

In summary, an event attestation attesting to the occurrence of a later event during the lifecycle of the electronic device may include event chain information dependent on information from at least one event attestation for attesting to the occurrence of at least one earlier event that should have occurred before the later event during the lifecycle of the electronic device. For example the event chain information may be a hash value which depends on a corresponding hash value for at least one earlier event attestation. The validation apparatus may then prevent the predetermined action being performed for the electronic device when the event chain information for the received event attestations indicates that events occurred in a prohibited sequence.

Time Stamped Holograms

A further extension to the techniques discussed above is described below. This can be performed together with the linked holograms extension described above, or alternatively can be applied even if the linked holograms extension is not used. When injecting the holograms into the electronic device during the various manufacturing steps, an audit log indicating a time of occurrence of one or more local events occurring at the electronic device may be recorded by the electronic device. During validation, the validation apparatus may determine based on the audit log whether the predetermined action is permitted (in addition to validation based on the event attestations themselves). The local events recorded in the audit log could be any significant event relating to the installation or use of event attestations or handling of the device during its progress through the manufacturing chain. For example, the synchronized time each hologram was inserted into the device may be recorded in the audit log. Furthermore, a record of every boot (and optionally) the functions called are also logged for future ODM fraud detection. A map of connected hardware peripherals could also be monitored. The validation apparatus may have access to information indicating when a batch of devices associated with a particular event attestation were processed, which can be compared with the audit log to determine whether to permit the predetermined action.

Use of such an audit log can increase the likelihood that the validation apparatus is able to detect cases when device has visited an illegal manufacturer/adapter during the creation of the device, but no holograms were installed or altered by the illegal manufacturer/adapter. That is, assume the flow SiP→ODMA→ODMB→ODMD→OEM is legal. However, if the device was intercepted during transport between ODMA and ODMB and taken to another party ODMX, the end-device would still validate as all of the expected holograms would be present.

Hence, a means is provided to analyse at device "birth" (or any other time of interest) if the device followed an assumed and correct path from SiP to OEM and that there were no detours taken that might invalidate such a claim. That is, in addition to having all the relevant holograms verified and in-place, the extra logging the system has provided can be used to analyse the device to ensure it was correctly manufactured.

Adding time of their installation and a protected record (until device birth) of relevant functions called or otherwise flows of interest) enables the highest possible level of assurance. The device may have a secure world (protected execution environment) and may always start in the secure world after being booted. This means that logging cannot be tampered or modified—because the secure world cannot be altered. Also, if the hardware identifiers of any connected peripherals were logged in the audit log, tampering could potentially be detected too.

After device "birth" the audit logging functionality could be disposed of (similar to discarding the event attestations or keys/identifiers used for the Birth phase once the device access to the service has been enabled) or alternatively turned off—i.e. it may only serve to detect fraudulent ODMs, it need not be considered to always be active.

During each step through the factory processes, when a hologram is inserted into a device 2, the precise time (UTC synchronized for simplicity) may be written to the IoT device as well, as a time stamp corresponding to that hologram installation. This gives the IoT device 2 a timeline which can be analysed at a later time when all of the holograms are verified. The timeline shows when all the holograms were inserted into the device. This can be done by either the hologram server injecting the holograms, or the device itself (or both). Whether the hologram server or device logs the time may depends on the exact trust one can exert from the hologram server or the device. Using both together (logging the time at both the hologram server and device) can provide a compromise to increase security.

In addition to this, every time the IoT device boots (until it becomes "born"), because the software always begins in the secure world—the IoT device may also store a record of these starts in an additional audit log. This additional file may be size limited (although stored in the secure storage) to a certain number of records (e.g. the last 100 boot cycles, which can be overwritten in a FIFO manner, or whatever is feasible). In addition, the audit log may also comprise counters for relevant functions that have been executed. For example, rather than storing all the 345 last boot cycles, a counter stating 345 is stored, and the last 100 boot cycles are all what remains—as this saves space (unless there is "unlimited" storage). Exactly what is stored and how much can be varied from implementation to implementation.

If supported by intrinsic hardware on the electronic device 2, the device 2 can also write time stamps for each start, along any other relevant information (like what secure world functions have been called etc.). If there is no [backup] battery in the IoT device, or otherwise not reliable, a monotonic counter could be used to indicate a strict order to the boots, but would not necessarily be aligned with a wall clock. This counter could optionally be backed by OTP memory or otherwise available hardware. Hence, it is not essential for the recorded time to be an absolute (synchronised time).

The purpose of this audit log is to assist in validating what an IoT device has gone through before it became a legitimate product. Boot cycles outside of factory injections of holograms could indicate suspicious activities, or it might show an IoT device went through many iterations before it became a real product. This can help in determining if an IoT device followed a good common flow or something irregular occurred.

Furthermore, the idea is that this audit log is only used up and until the IoT device is "born", and after that, it is discarded or not used—it is only the first steps that are relevant to capture to determine fraudulent ODM activities, not the ones following when it becomes used by an end-user. Alternatively, on the other hand, the feature could still be used for debugging and assisting if a problem occurs, or otherwise to capture malicious usage by the end-user utilizing the IoT device.

The threat model this idea attempts to mitigate is that a device has been tinkered with outside of the "ordinary" factory flow. The assumption here is that if a hardware component has been inserted or altered, it would be reasonable to assume that the device at least was power cycled to ensure it was functioning correctly before it resumed the originally [intended] flow. This is of course not strictly necessary, and this idea would only then serve to better explain the cycles the device took before it became a legitimate (?) device.

For example, if a batch of devices were created as follows:

| Hologram number | Hologram ID | Dates encountered |
|---|---|---|
| 1 | 0xF00BA | First seen: 2017-01-05 13:13:13 UTC+1 |
| | | Last seen: 2017-01-05 14:13:12 UTC+1 |
| 2 | 0xBEEF1 | First seen: 2017-01-08 01:01:13 UTC+1 |
| | | Last seen: 2017-01-08 04:54:12 UTC+1 |
| 3 | 0xABCDE | First seen: 2017-01-10 01:23:45 UTC+1 |
| | | Last seen: 2017-01-10 14:32:02 UTC+1 |

That is, the first hologram was encountered at 13:13:13 and then last seen at 14:13:12, (i.e. Hologram ID 0xFOOBA). The same logic applies to the following depicted holograms above. In this context, it shows the flow of that batch and after 14:13:12, another batch of devices were created with a different Hologram ID.

Now, the chain expected for this device might be exactly that Hologram 1 must come before Hologram 2 and that they are (optionally linked as in the previously referenced extension), verified accordingly. In addition, Hologram IDs are checked for fraud and hologram assertions validated too (as discussed above).

Now, if the audit log that this device 2 carries showed the following audit log (in addition to the holograms (it will be appreciated that this is a severely simplified example):

| Date/time | Function | Extra |
|---|---|---|
| 2017-01-06 20:00:00 UTC+1 | importHologram( ) | Function failed, H1 did not match |
| 2017-01-09 10:10:10 UTC+1 | | Device booted |
| 2017-02-05 11:11:11 UTC+1 | xxy( ) | Device xx:yy:zz changed ID from ab:ba to ef:fe |

Several things could be deduced:
1. The importHologram( ) functions was called on the 6$^{th}$ of January at 20:00, and failed to import the supplied Hologram (because H1 did not match the intended parameters). This indicates something is wrong, because as discussed above, it is known that between Hologram 1 and Hologram 2, there should be no Holograms imported into the device, thus this is suspicious.
2. At 10:10 a.m. on the 9th of January, the device booted and no other specific secure world functions were called. However, as seen above in the Hologram table, the 3$^{rd}$ hologram was successfully imported (first seen) at 01:23 on the 10$^{th}$ of January. So, in that case—why did the device boot? Was that a routine check, or was this in fact a fraudulent boot which should not have happened because the device should have been on route to the third ODM at that time, and subsequently could (should) not have been able to boot? Hence, this could indicates suspicious behavior, which could potentially be something to further investigate. If there were more functions logged in the audit log, they might explain why the device booted, or what it did once booted.
3. In addition, (if so supported), the software could keep track of all the connected peripherals and bus masters etc., and if during a routine check a new one was found to have been altered (since the last check), an entry to the audit log would be written. This could be acceptable behavior, or suggest a fraudulent substitution of a legitimate part to another one (which might indicate that the device is not legitimate anymore). This of course assumes that the switched part had a different id than the original one.

It is not essential for the validation server 60 to check every single device during enrolment (checking of the audit log may be more computationally expensive than validating the holograms). Hence, in some cases the validation server 60 could select a subset of devices for further analysis and skip the majority of devices, unless there was a stronger need to analyze the devices (but it would most likely add time to enrollment which might not be acceptable en masse).

Further example arrangements are set out in the following clauses:

(1) A method for validating an electronic device, comprising:
receiving attestation information provided by the electronic device attesting that the electronic device has received a plurality of event attestations, each event attestation providing a cryptographically authenticated attestation to the occurrence of a respective event during a lifecycle of the electronic device; and determining a validation result indicating whether the attestation information is valid.

(2) The method of clause (1), wherein the attestation information comprises said plurality of event attestations.

(3) The method of clause (1), wherein the attestation information comprises at least one cryptographically authenticated attestation attesting that the electronic device has verified that the plurality of event attestations were received by the electronic device.

(4) The method of any preceding clause, wherein the same event attestation is used to attest to the occurrence of a given event for a plurality of different electronic devices.

(5) The method of any preceding clause, comprising determining a usage count indicative of a number of other electronic devices that have already attested to receiving a particular event attestation, and determining the validation result in dependence on the usage count.

(6) The method of any preceding clause, comprising maintaining a record of at least one revoked event attestation, and determining the validation result in dependence on whether a particular event attestation attested in the attestation information is one of said at least one revoked event attestation.

(7) The method of any preceding clause, wherein an event attestation attesting to the occurrence of a later event during the lifecycle of the electronic device includes event chain information dependent on information from at least one event attestation for attesting to the occurrence of at least one earlier event that should have occurred before the later event during the lifecycle of the electronic device.

(8) The method of clause (7), comprising determining the validation result in dependence on whether the event chain information for the plurality of event attestations indicates that events occurred in a prohibited sequence.

(9) The method of any preceding clause, comprising receiving from the electronic device an audit log indicating a time of occurrence of one or more local events occurring at the electronic device, and determining the validation result in dependence on the audit log.

(10) The method of clause (9), wherein said one or more local events comprise at least one of: installation of a given event attestation on the electronic device; calling of a given program code function by the electronic device; booting of the electronic device; and updating of one or more attributes of the electronic device.

(11) The method of any of clauses (9) and (10), comprising determining the validation result in dependence on a comparison of the audit log with information indicating when a batch of electronic devices associated with a given event attestation were processed by a given manufacturer.

(12) The method of any preceding clause, wherein a given event attestation is determined to be valid when validated using a cryptographic key associated with a manufacturer or adapter permitted to cause the corresponding required event to be performed for the electronic device.

(13) The method of clause (12), wherein the same cryptographic key is used to validate event attestations for a plurality of electronic devices.

(14) The method of any preceding clause, wherein the validation result comprises a determination of whether a predetermined action is permitted for the electronic device.

(15) The method of any preceding clause, wherein the validation result comprises a device report indicative of information derived from said plurality of event attestations.

(16) A validation apparatus for validating an electronic device, comprising:
communication circuitry to receive attestation information provided by the electronic device attesting that the electronic device has received a plurality of event attestations, each event attestation providing a cryptographically authenticated attestation to the occurrence of a respective event during a lifecycle of the electronic device; and processing circuitry to determine a validation result indicative of whether the attestation information is valid.

(17) An electronic device, comprising:
communication circuitry to communicate with an external device; and
processing circuitry to control the communication circuitry to transmit a validation request to a validation apparatus, the validation request comprising attestation information attesting that the electronic device has received a plurality of event attestations, each event attestation comprising a cryptographically authenticated attestation to the occurrence of a respective event during a lifecycle of the electronic device.

(18) The electronic device according to clause (17), wherein the attestation information comprises said plurality of event attestations.

(19) The electronic device according to clause (17), wherein the attestation information comprises at least one cryptographically authenticated attestation attesting that the electronic device has verified that the plurality of event attestations were received by the electronic device.

(20) The electronic device according to any of clauses (17) to (19), wherein each event attestation is associated with a hash value corresponding to a result of a predetermined hash function applied to contents of the event attestation.

(21) The electronic device according to clause (20), wherein in response to a new event attestation provided to the electronic device, the processing circuitry is configured to reject the new event attestation in the storage circuitry when a mismatch is detected between the hash value of the new event attestation and a result of the predetermined hash function applied to the contents of the new event attestation.

(22) The electronic device according to clause (21), wherein the processing circuitry is configured to discard a stub portion of said contents of the new event attestation after the new event attestation has been validated, wherein the hash value is dependent on the stub portion.

(23) The electronic device according to clause (22), wherein the new event attestation is associated with a signature derived from said hash value and said contents of the new event attestation excluding said stub portion; and
the attestation information comprises the signatures associated with the plurality of event attestations or an indication that the signatures associated with the plurality of event attestations have been validated.

(24) The electronic device according to clause (23), wherein the signature is signed using a cryptographic key associated with a manufacturer or adapter who caused the corresponding event to be performed on the electronic device during the lifecycle of the electronic device.

(25) The electronic device according to any of clause (20) to (24), wherein for an event attestation attesting to the occurrence of a later event during the lifecycle of the electronic device, the hash value is dependent on information from at least one event attestation attesting to the occurrence of at least one earlier event that should have occurred before the later event during the lifecycle of the electronic device.

(26) The electronic device according to any of clauses (17) to (25), wherein the processing circuitry is configured to maintain an audit log indicating a time of occurrence of one or more local events occurring at the electronic device;
wherein the validation request comprises at least a portion of the audit log.

(27) The electronic device according to any of clauses (17) to (26), wherein one of said event attestations comprises a conditional event attestation for attesting to the occurrence of a predetermined event in the lifecycle of the device on condition that a predetermined condition is satisfied by the electronic device; and
said processing circuitry is configured to validate whether the predetermined condition is satisfied and to prevent transmission of attestation information attesting that the conditional event attestation has been validly received when the predetermined condition is not satisfied.

(28) The electronic device according to clause (27), wherein the predetermined condition comprises specific software being installed at a predetermined region of the storage circuitry.

(29) The electronic device according to any of clauses (17) to (28), wherein the validation request comprises a request to access a predetermined service using the electronic device.

(30) The electronic device according to clause (29), wherein in response to access to the predetermined service being enabled, the processing circuitry is configured to trigger at least one of: deletion of the plurality of event attestations from storage circuitry; deletion of at least one device key for protecting communication between the electronic device and the validation apparatus; deletion of a device identifier for identifying the electronic device to the validation apparatus; storage of at least one device key for protecting communication between the electronic device and a service provider of the predetermined service; and storage of a device identifier for identifying the electronic device to the service provider of the predetermined service.

(31) The electronic device according to any of clauses (29) and (30), wherein in response to receiving a rebirth request received from a service provider of the predetermined service, the processing circuitry is configured to delete information arising from use of said predetermined service since the access to the predetermined service was enabled.

(32) The electronic device according to clause (31), wherein the rebirth request comprises at least one rebirth event attestation attesting to occurrence of at least one event; and in response to the rebirth request, the processing circuitry is configured to store said at least one rebirth event attestation to storage circuitry for generating the attestation information for a subsequent validation request.

(33) A method for an electronic device, comprising:
generating a validation request comprising attestation information attesting that the electronic device has received a plurality of event attestations, each event attestation comprising a cryptographically authenticated attestation to the occurrence of a respective event during a lifecycle of the electronic device; and
transmitting the validation request to a validation apparatus.

(34) A method for manufacturing or adapting a batch of electronic devices, comprising:
causing a predetermined event to be performed for each of the batch of electronic devices; and
storing an event attestation in each of the batch of electronic devices, the event attestation comprising a cryptographically authenticated attestation to the occurrence of the predetermined event;
wherein the event attestation is cryptographically authenticated using the same cryptographic key for each of the batch of electronic devices.

(35) The method of clause (34), wherein the event attestation is the same for each of the batch of electronic devices.

(36) The method of any of clauses (34) and (35), comprising storing a plurality of event attestations in each of the batch of electronic devices, the plurality of event attestations corresponding to a plurality of events performed for each of the batch of electronic devices.

(37) The method of any of clauses (34) to (36), wherein the event attestation comprises pre-prepared information generated independently of information read from the electronic devices.

(38) The method of any of clauses (34) to (37), wherein the event attestation comprises: a hash value corresponding to a result of a predetermined hash function applied to contents of the event attestation including a stub portion; and
a signature derived from said hash value and said contents of the new event attestation excluding said stub portion.

(39) The method of clause (38), wherein the signature is signed using a cryptographic key associated with a manufacturer or adapter processing the batch of electronic devices.

(40) The method of any of clauses (34) to (39), wherein the event attestation comprises information dependent on information from at least one event attestation attesting to the occurrence of at least one earlier event that should have been performed before the predetermined event during the lifecycle of each of the batch of electronic devices.

(41) Electronic device manufacturing equipment, comprising:
equipment to cause a predetermined event to be performed for each of the batch of electronic devices; and
equipment to store an event attestation in each of the batch of electronic devices, the event attestation comprising a cryptographically authenticated attestation to the occurrence of the predetermined event;
wherein the event attestation is cryptographically authenticated using the same cryptographic key for each of the batch of electronic devices.

(42) A computer program comprising instructions for controlling a data processing apparatus to perform the method of any of clauses (1) to (15) and (33) to (40).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for validating an electronic device, comprising:
receiving from the electronic device an audit log indicating a time of occurrence of one or more local events occurring at the electronic device;
receiving attestation information provided by the electronic device attesting that the electronic device has received a plurality of event attestations, each event attestation providing a cryptographically authenticated attestation to an occurrence of a respective event for the electronic device during a lifecycle of the electronic device; and
determining a validation result in dependence on the audit log and a comparison of the audit log with information indicating when a batch of electronic devices associated with a given event attestation were processed by a given manufacturer, wherein the validation result indicates whether the attestation information is valid.

2. The method of claim 1, wherein the attestation information comprises said plurality of event attestations; or
the attestation information comprises at least one cryptographically authenticated attestation attesting that the electronic device has verified that the plurality of event attestations were received by the electronic device.

3. The method of claim 1, wherein a same event attestation is used to attest to an occurrence of an event for a plurality of different electronic devices.

4. The method of claim 1, comprising at least one of:
determining a count indicative of a number of other electronic devices that have already attested to receiving a particular event attestation, and determining the validation result in dependence on the count; and maintaining a record of at least one revoked event attestation, and determining the validation result in dependence on whether a particular event attestation attested in the attestation information is one of said at least one revoked event attestation.

5. The method of claim 1, wherein an event attestation attesting to an occurrence of a later event during the lifecycle of the electronic device includes event chain information dependent on information from at least one event attestation for attesting to an occurrence of at least one earlier event expected to occur before the later event during the lifecycle of the electronic device.

6. The method of claim 5, comprising determining the validation result in dependence on whether the event chain information for the plurality of event attestations indicates that events occurred in a prohibited sequence.

7. The method of claim 1, comprising receiving from the electronic device an audit log indicating a time of occurrence of one or more local events occurring at the electronic device, and determining the validation result in dependence on the audit log.

8. The method of claim 1, wherein said one or more local events comprise at least one of:
 installation of a given event attestation on the electronic device;
 calling of a given program code function by the electronic device;
 booting of the electronic device; and
 updating of one or more attributes of the electronic device.

9. The method of claim 1, wherein an event attestation is determined to be valid when that event attestation is validated using a cryptographic key associated with a manufacturer or adapter that is permitted to cause a respective event to be performed for the electronic device.

10. The method of claim 9, wherein a same cryptographic key is used to validate event attestations for a plurality of electronic devices.

11. A non-transitory storage medium storing a computer program comprising instructions, which when executed by a data processing apparatus, cause the data processing apparatus to perform the following method for validating an electronic device:
 receiving from the electronic device an audit log indicating a time of occurrence of one or more local events occurring at the electronic device;
 receiving attestation information provided by the electronic device attesting that the electronic device has received a plurality of event attestations, each event attestation providing a cryptographically authenticated attestation to an occurrence of a respective event for the electronic device during a lifecycle of the electronic device; and
 determining a validation result in dependence on the audit log and a comparison of the audit log with information indicating when a batch of electronic devices associated with a given event attestation were processed by a given manufacturer, wherein the validation result indicates whether the attestation information is valid.

12. A method for an electronic device, comprising:
 generating a validation request comprising attestation information attesting that the electronic device has received a plurality of event attestations, each event attestation comprising a cryptographically authenticated attestation to an occurrence of a respective event for the electronic device during a lifecycle of the electronic device; and
 transmitting the validation request to a validation apparatus,
 wherein each event attestation is associated with a hash value corresponding to a result of a predetermined hash function applied to contents of the event attestation;
 the method further comprises, in response to a new event attestation provided to the electronic device;
 when the new event attestation is validated, discarding a stub portion of said contents of the new event attestation, and
 when a mismatch is detected between the hash value of the new event attestation and a result of the predetermined hash function applied to the contents of the new event attestation, rejecting the new event attestation,
 wherein the hash value is dependent on the stub portion.

13. The method according to claim 12, wherein the new event attestation is associated with a signature derived from said hash value and said contents of the new event attestation excluding said stub portion; and
 the attestation information comprises the signatures associated with the plurality of event attestations or an indication that the signatures associated with the plurality of event attestations have been validated.

14. A method for an electronic device, comprising:
 generating a validation request comprising attestation information attesting that the electronic device has received a plurality of event attestations, each event attestation comprising a cryptographically authenticated attestation to an occurrence of a respective event for the electronic device during a lifecycle of the electronic device; and
 transmitting the validation request to a validation apparatus,
 wherein one of said event attestations comprises a conditional event attestation for attesting to an occurrence of a predetermined event in the lifecycle of the electronic device on condition that a predetermined condition is satisfied by the electronic device; and
 the method comprises validating whether the predetermined condition is satisfied and preventing transmission of attestation information attesting that the conditional event attestation has been validly received when the predetermined condition is not satisfied.

15. The method for the electronic device according to claim 14, wherein the predetermined condition comprises specific software being installed at a predetermined region of storage circuitry.

16. A non-transitory storage medium storing a computer program comprising instructions, which when executed by a data processing apparatus, cause the data processing apparatus to perform the following method for an electronic device:
 generating a validation request comprising attestation information attesting that the electronic device has received a plurality of event attestations, each event attestation comprising a cryptographically authenticated attestation to an occurrence of a respective event for the electronic device during a lifecycle of the electronic device; and
 transmitting the validation request to a validation apparatus, wherein one of said event attestations comprises a conditional event attestation for attesting to an occurrence of a predetermined event in the lifecycle of the electronic device on condition that a predetermined condition is satisfied by the electronic device; and the method comprises validating whether the predetermined condition is satisfied and preventing transmission of attestation information attesting that the conditional event attestation has been validly received when the predetermined condition is not satisfied.

\* \* \* \* \*